United States Patent
Verley, IV et al.

(10) Patent No.: US 11,087,379 B1
(45) Date of Patent: Aug. 10, 2021

(54) BUYING PRODUCTS WITHIN VIDEO CONTENT BY VOICE COMMAND

(71) Applicant: GOOGLE LLC, Mountain View, CA (US)

(72) Inventors: Filip Verley, IV, Redwood City, CA (US); Stuart Ross Hobbie, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 903 days.

(21) Appl. No.: 14/621,365

(22) Filed: Feb. 12, 2015

(51) Int. Cl.
*G06Q 30/06* (2012.01)
*G10L 17/22* (2013.01)
*G06Q 20/40* (2012.01)

(52) U.S. Cl.
CPC ... *G06Q 30/0633* (2013.01); *G06Q 20/40145* (2013.01); *G10L 17/22* (2013.01)

(58) Field of Classification Search
CPC .......... G06Q 30/0633; G06Q 30/0623; G06Q 30/0601; G06Q 20/40145; G10L 17/22
USPC ........................................ 705/26.8
See application file for complete search history.

(56) References Cited

U.S. PATENT DOCUMENTS

| 2002/0116195 | A1* | 8/2002 | Pitman | G06Q 30/06 704/260 |
| 2009/0177651 | A1* | 7/2009 | Takamatsu | G06F 16/9535 |
| 2010/0049626 | A1* | 2/2010 | Hong | H04N 21/8113 705/26.1 |
| 2010/0241962 | A1* | 9/2010 | Peterson | G11B 27/34 715/720 |
| 2014/0244488 | A1* | 8/2014 | Kim | H04L 1/1614 705/39 |
| 2014/0249817 | A1* | 9/2014 | Hart | G10L 15/22 704/239 |
| 2016/0066005 | A1* | 3/2016 | Davis | H04N 21/258 725/19 |
| 2016/0322045 | A1* | 11/2016 | Hatfield | G10L 21/0208 |

OTHER PUBLICATIONS

Wald, Michael, "CD-I developer gets on board for 'channel surfing'" published Apr. 18, 1994, on p. 48 of Computer Retail Week in USA ; retrieved from Dialog on May 8, 2021.*

* cited by examiner

*Primary Examiner* — Yogesh C Garg
(74) *Attorney, Agent, or Firm* — Foley & Lardner LLP

(57) ABSTRACT

A user registers for an account with an account management system, configures account settings to permit the account management system to receive user computing device data from a user computing device associated with the user, and logs into the account via the user computing device. The account management system receives a user voice purchase command and determines a purchase command context based on the received user computing device data. The account management system identifies a product that the user desires to purchase based on the purchase command context and directs the user computing device web browser to a merchant website to set up a transaction for the identified product.

17 Claims, 9 Drawing Sheets

BUYING PRODUCTS WITHIN VIDEO CONTENT BY VOICE COMMAND

TECHNICAL FIELD

The present disclosure relates to improving user convenience in online shopping by enabling a user to purchase via voice command a product displayed or broadcasted to the user on a user computing device or on an electronic device in proximity to a user computing device.

BACKGROUND

Users often desire to purchase a product while watching or listening to an advertisement about the product or a review of the product. For example, a user may watch an advertisement for the product on television and desire to purchase the product. However, it may be inconvenient and time consuming for a user to search for the desired product and purchase the product online. For example, the user may have to input a product name into a search engine, select a merchant website offering the product for sale, and add the product to a virtual shopping cart on the merchant website. A user may use a voice command as a convenient way to input a product name into a search engine. Current technology does not, however, provide for determining a context of a voice purchase command submitted by a user, determining a product the user desires to purchase based on the context, and setting up a purchase transaction for the product with a merchant system offering the product for sale.

SUMMARY

Techniques herein provide computer-implemented methods to set up a purchase transaction for a product identified based on a context of a voice purchase command submitted by a user. In an example embodiment, a user registers for an account with an account management system, configures account settings to permit the account management system to continuously receive user computing device data from a user computing device associated with the user, and logs into the account via the user computing device. The account management system receives a user voice purchase command and determines a purchase command context based on the received user computing device data. The account management system identifies a product that the user desires to purchase based on the purchase command context and directs the user computing device web browser to a merchant website to set up a transaction for the identified product.

In certain other example aspects described herein, systems and computer program products to set up a purchase transaction for a product identified based on a context of a voice purchase command submitted by a user are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
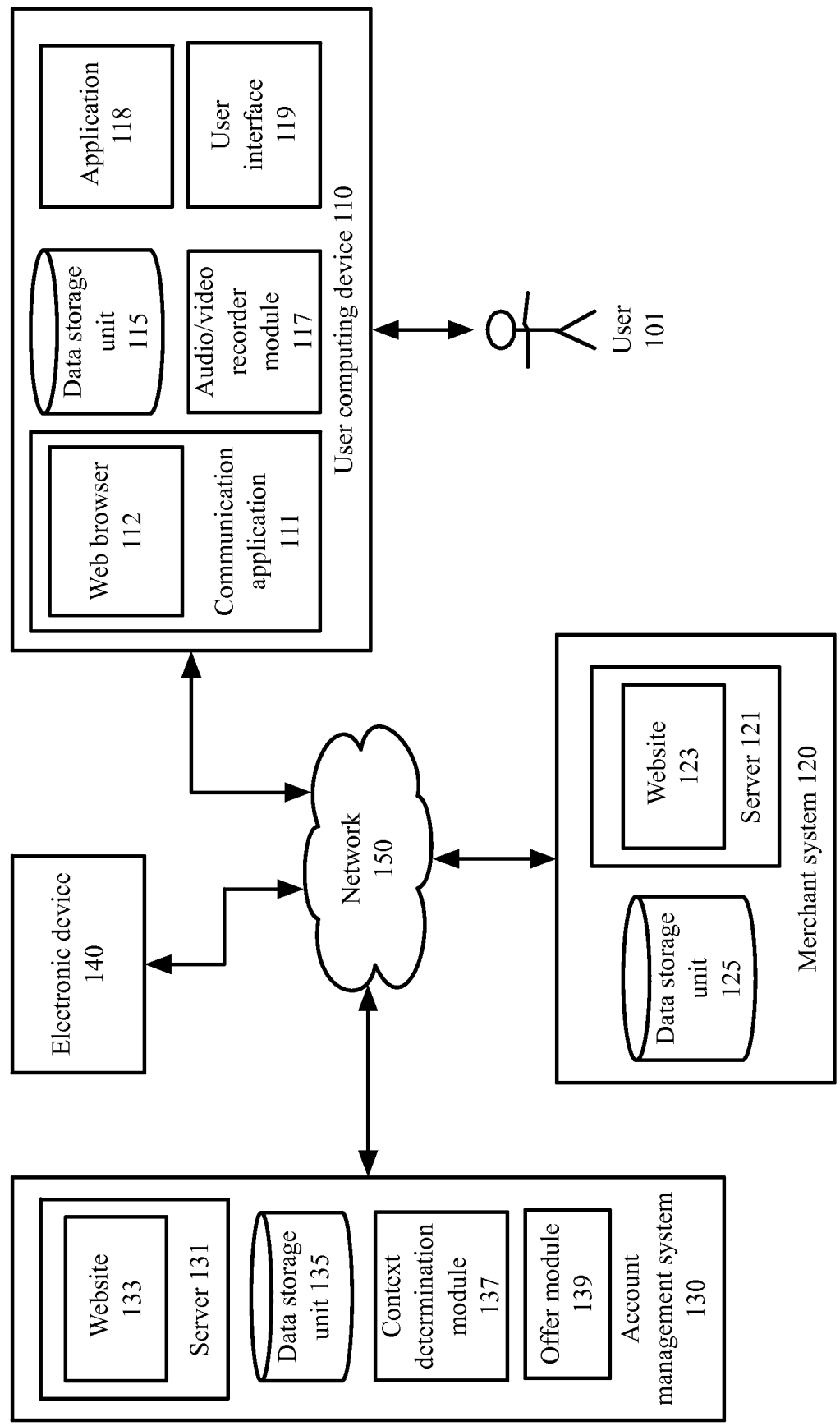
FIG. 1 is a block diagram depicting a system for setting up a purchase transaction for a product identified based on a context of a voice purchase command submitted by a user, in accordance with certain example embodiments.

The example embodiments described herein provide computer-implemented techniques for setting up a purchase transaction for a product identified based on a context of a voice purchase command submitted by a user. In an example embodiment, a user registers for an account with an account management system, configures account settings to permit the account management system to continuously receive user computing device data from a user computing device associated with the user, and logs into the account via the user computing device. The account management system receives a user voice purchase command and determines a purchase command context based on the received user computing device data. The account management system identifies a product that the user desires to purchase based on the purchase command context and directs the user computing device web browser to a merchant website to set up a transaction for the identified product.

In an example embodiment, a user accesses an account management system website, establishes an account with the account management system, and downloads an application onto the user computing device. In an example embodiment, the user establishes a voice signature to associate with voice purchase commands that the account management system can use to verify the authenticity of voice commands by the user to purchase a product. For example, the voice signature may be a password, a frequency of the user's voice, an accent of the user's voice, or other relevant signature characteristic of the user's voice or method of making voice purchase commands. For example, the user may configure the account such that the account management system will only regard purchase commands that begin with "Hello! I would like to purchase . . . "

The user logs into the account via the application and configures the account settings of the account to permit the account management system to continuously receive user computing device data. In an example embodiment, the user may permit the user computing device to transmit data to the account management system associated with an environment external to the user computing device. For example, the user may permit the user computing device to transmit location data, an audio feed, a video feed, and/or other data describing an environment of the user computing device. In another example embodiment, the user may permit the user computing device to transmit data to the account management comprising an internal status of the user computing device. For example, the user may permit the user computing device to transmit data comprising what video file the user is currently watching, what audio file the user is currently hearing, what website the user is currently viewing, what text the user is currently viewing, and/or what image the user is currently viewing on the user computing device. In an example embodiment, a user logs into the account and the user computing device continuously and/or periodically transmits applicable data to the account management system via a network according to the user's configurations.

In certain example embodiments, the user opens a video on the user computing device. In another example embodiment, the user opens an image, a website, a text file, an audio file, or an application on the user computing device. The user watches the video or otherwise interacts with the user computing device to access an image, a website, a text file, an audio file, or an application stored on the user computing device or accessible to the user computing device via a network. In an example embodiment, as the user is watching the video or other media, the user views a product that the user desires to purchase. The user inputs a voice purchase command to the user computing device. In an example embodiment, the voice purchase command comprises an ambiguous term or part of speech. For example, the user views a video on the user computing device, sees a product, and says "I want to buy that," wherein the word "that" is an ambiguous term. The account management system receives the user's voice command from the user computing device and continuous and/or period user computing device data.

In certain other example embodiments, the user activates an electronic device external to the user computing device, such as a television or a radio, and watches/listens to video, audio, and/or text on the electronic device. For example, the user turns on a television and watches a television program. The user views, hears, or otherwise becomes aware of a product that the user desires to purchase via observation of the output of the electronic device. For example, the user views an advertisement on the television program for pizza from merchant A and desires to purchase merchant A pizza. The user inputs a voice command to the user computing device. In an example embodiment, the voice purchase command comprises an ambiguous term or part of speech. For example, the user views a video on the user computing device, sees a product, and says "I want to buy that," wherein the word "that" is an ambiguous term. The account management system receives the user's voice command from the user computing device and continuous and/or period user computing device data.

In an example embodiment, the account management system verifies the voice signature of the user's voice purchase command according to the user's account settings. For example, the account management system verifies the quality of the user's tone, accent, or other quality of speech or voice and compares it against one or more true voice recordings provided previously by the user. In another example embodiment, the account management system determines whether a necessary password or passphrase is present in the voice command. In an example embodiment, the account management determines that the voice purchase command is invalid because it does not match the voice signature provided by the user and ignores the command. In another example embodiment, the account management system determines that the voice purchase command is valid because it matches the voice signature provided by the user. In this example embodiment, the account management system determines a purchase command context associated with the voice purchase command.

In an example embodiment, the account management system determines the grammar of the received voice command and identifies any ambiguous terms. For example, the user's voice command comprises "I want to purchase this," wherein "this" is an ambiguous term. The account management system retrieves a user computing device data feed for a predefined time before the voice purchase command was submitted. For example, the account management system may retrieve the data feed for a time range of between one minute before the voice command was submitted and the time at which the voice command was submitted. In example embodiment, the account management system determines whether a file was being displayed to a user on the user computing device at the time the voice command was submitted. For example, the account management system can determine, based on the data feed, whether the user computing device was displaying a video, image, text, audio, or if a program, application, or website was open on the user computing device at the time the user submitted the voice purchase command. In certain example embodiments, the account management system can determine to what point of the video or audio the user the user has progressed. For example, the account management system determines that at the time of the submission of the voice purchase command the user was three minutes and fifty-four seconds through a five minute video. In an example embodiment, the account management system comprises annotated video and/or audio clips that describe which products are displayed or broadcasted at what time during the video and/or audio file.

If the account management system determines that a file was being displayed to a user at the time the voice command was submitted, the account management system determines if a product was being shown to a user on the displayed file that can provide a purchase command context to one or more ambiguous terms of the received voice purchase command. If the account management system determines that a product was being shown to the user on the displayed file at the time the voice purchase command was submitted that provides a satisfactory purchase command context to the one or more ambiguous terms of the command, the account management determines the displayed file provides a purchase command context for the voice purchase command.

If the account management system determines that a file was not being displayed to a user at the time the voice command was submitted, or is unable to find a satisfactory purchase command context to one or more ambiguous terms of the voice purchase command based on a displayed file, the account management system determines the location of the user computing device at the time the voice command was submitted. The account management system determines programming of the external electronic device based on the user computing device location and external data associated with the data feed. For example, external data comprises an audio feed, a video feed, or other applicable input to the user computing device that describes an environment of the user computing device. In an example embodiment, the account management system determines that the programming of the external electronic device provides a product purchase content for the voice purchase command.

In certain example embodiments, the account management system analyzes applicable data internal to the user computing device to attempt to identify a desired product associated with a user's voice purchase command. For example, the account management system knows that, for a particular five minute video displayed on the user computing device, at 2:54, the video displays a brand A baseball bat, at 3:15, the video displays a brand B baseball bat, and at 3:40, the video displays a brand A baseball glove to the user via the user computing device. If a voice purchase command comprising, "buy this now," is received when the video is at 3:41, the account management system may determine that the purchase command context comprises a user's desire to purchase the displayed brand A baseball glove. In another example embodiment, the account management system is unable to identify a product based on internal user computing device data. In certain example In certain example embodiments, the account management system analyzes applicable data external to the user computing device to attempt to identify a desired product associated with a user's voice purchase command. For example, the account management system identifies a programming schedule for the electronic device in the user's area and receives an audio input of the electronic device output to determine exactly what the user was watching or listening to at the time of the voice command. In an example embodiment, the account management system comprises annotated video and/or audio clips that describe which products are displayed or broadcasted at what time during the electronic device program. For example, the account management system knows that, for a particular hour long television program, at 12:55-14:55, the television program displays a pizza advertisement, at 35:05-40:00, the television program displays vacuum cleaner advertisement, and at 55:55-57:30, the television program displays an advertisement for potato chips. If a voice purchase command comprising, "buy this now," is received when the television program is at 13:05, the account management system may determine that the purchase command context comprises a user's desire to purchase the pizza displayed in the pizza advertisement. In another example embodiment, the account management system is unable to identify a product based on one or of internal user computing device data and external user computing device data.

In certain example embodiments, the account management system requests and receives user input to attempt to identify a desired product associated with a user's voice purchase command. In these example embodiments, the user input may be used in addition to one or more of internal user computing device data and external user computing device data to identify the desired product. In an example embodiment, the account management system may request user input to further determine product specifications. For example, the account management system determines that the user wants to purchase a particular brand and model of hat, then asks the user, via the user computing device, what size hat the user wants to purchase. In this example, the user transmits a response to the account management system via the user computing device comprising a selection of a medium sized hat. After receiving user input, if the account management system is still unable to identify a product associated with the user's voice purchase command, the account management system may request further user input or may request that the user manually enter a description of the product that the user desires to purchase.

In an example embodiment, the account management system finds an offer associated with the identified product that the user desires to purchase. The account management system redirects the user computing device web browser to a merchant system website offering the product for sale. The user submits payment information and shipping information to the merchant system website and selects an option to initiate a payment transaction with the merchant system website to purchase the product. In another example embodiment, the user has an established digital wallet account with the account management system and the account management system provides user selected payment information to the merchant system website. In an example embodiment, the merchant system processes the payment transaction. For example, the merchant system communicates a payment authorization request to a credit card issuer system associated with credit card payment information entered by the user as payment information. In this example, the merchant system receives an approval of the payment authorization request from the issuer system and communicates a receipt to the user computing device indicating a successful payment transaction.

By using and relying on the methods and systems described herein, the account management system and the user computing device enable the user to purchase a product displayed or broadcasted to the user on a user computing device or on an electronic device in proximity to a user computing device via voice command. Additionally, because the account management system determines a purchase command context associated with the user voice purchase command, the user does not have to specifically provide the name of the desired product in the voice purchase command. As such, the systems and methods described herein may provide a convenience to the user.

Example System Architecture

Turning now to the drawings, in which like numerals indicate like (but not necessarily identical) elements throughout the figures, example embodiments are described in detail.

FIG. 1 is a block diagram depicting a system 100 for setting up a purchase transaction for a product identified based on a context of a voice purchase command submitted by a user, in accordance with certain example embodiments. As depicted in FIG. 1, the system 100 includes network computing devices 110, 120, 130, and 140 that are configured to communicate with one another via one or more networks 150. In some embodiments, a user associated with a device must install an application and/or make a feature selection to obtain the benefits of the techniques described herein.

In example embodiments, the network 150 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages, and allows for the measurement of a received signal strength indicator ("RSSI") or other similar measurement such as the free space path loss, the received channel power indicator ("RCPI"), the time of arrival ("TOA"), and/or the round trip time ("RTT"). Throughout the discussion of example embodiments, it should be understood that the terms "data" and "information" are used interchangeably herein to refer to text, images, audio, video, or any other form of information that can exist in a computer-based environment.

Each network computing device 110, 120, 130, and 140 includes a device having a communication module capable of transmitting and receiving data over the network 160. For example, each network computing device 110, 120, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, 130, and 140 are operated by users 101, merchant system 120 operators, account management system 130 operators, and users 101, respectively.

An example user computing device 110 comprises a communication application 111, a web browser 112, a data storage unit 115, an audio/video recorder module 117, an application 118, and a user interface 119.

In an example embodiment, the user 101 can use a communication application 111, such as a web browser 112 application or a stand-alone application 118, to view, download, upload, or otherwise access documents or web pages via a distributed network 160. In an example embodiment, the communication application 111 can interact with web servers or other computing devices connected to the network 150, including the user computing device 110, a web server 121 of a merchant system 120, and a web server 131 of the account management system 131.

In an example embodiment, the web browser 112 can enable the user 101 to interact with web pages using the user computing device 110. In an example embodiment, the user 101 may access a website 133 of the account management system 130 to establish an account with the account management system 130 via the web browser 112. In an example embodiment, the user 101 may access the user's 101 account maintained by the account management system 130 via the web browser 112. In certain example embodiments described herein, one or more functions performed by the application 118 may also be performed by a web browser 112 application associated with the account management system 130.

In an example embodiment, the data storage unit 115 comprises a local or remote data storage structure accessible to the user computing device 110 suitable for storing information. In an example embodiment, the data storage unit 115 stores encrypted information, such as HTML5 local storage.

In an example embodiment, the audio/video recorder module 117 records and/or receives as input an audio data feed or video data feed of the environment of the user computing device 110. For example the audio/video recorder module 117 comprises a camera module or an audio recorder module. In an example embodiment, the application 118 and/or the account management system 130 instructs the audio/video recorder module 117 to record input. In an example embodiment, the audio/video recorder module 117 continuously and or periodically records an input of the user computing device 110 module. For example, the audio/video recorder module 117 records an audio output of a television that a user 101 is watching in the vicinity of the user computing device 110.

In an example embodiment, the application 118 is a program, function, routine, applet, or similar entity that exists on and performs its operations on the user computing device 110. In certain embodiments, the user 101 must install the application 118 and/or make a feature selection on the user computing device 110 to obtain the benefits of the techniques described herein. In an example embodiment, the application 118 communicates with the account management system 130. In an example embodiment, a user 101 downloads the application 118 from an account management system website 133 onto a user computing device 110. In an example embodiment, a user 101 may access the user's 101 account via the application 118 and configure account permissions to allow the user computing device 110 to transmit internal data describing an internal operating state of the user computing device 110, external data describing an environment of the user computing device 110, and/or user 101 input submitted by the user 101 to the account management system 130. In an example embodiment, the user 101 may configure account settings via the application 118 to allow the account management system 130 to receive voice purchase commands submitted by the user 101 via the user computing device 110. In certain example embodiments, the application 118 is a digital wallet account that communicates with the account management system 130, which manages the user's 101 digital wallet account. In this this example embodiment, the user 101 may add, edit, or delete payment account information in the user's 101 digital wallet account via the application 118. In an example embodiment, when the user 101 is logged into the user's 101 account via the application 118 and the user 101 has configured account settings to allow the user computing device 110 to transmit data to the account management system 130, the application instructs the user computing device 110 to transmit one or more of internal data, external data, or user 101 input to the account management system 130. In this example embodiment, the application 118 may also instruct the audio/video recorder module 117 to record external data describing an environment of the user computing device 110. In this example embodiment, the application 118 continuously or periodically logs internal data describing an internal operating state of the user computing device 110.

In certain example embodiments described herein, one or more functions performed by the application 118 resident on the user computing device 110 may also be performed by a web browser 112 application associated with the account management system 130. In certain example embodiments described herein, one or more functions performed by the account management system 130 may also be performed by the application 118. In certain example embodiments described herein, one or more functions performed by the web browser 112 application associated with the account management system 130 may also be performed by the application 118.

In certain example embodiments described herein, the application 118 maintains periodic or constant communication with the account management system 130 via the network 150. In certain example embodiments, the application 118 and is able to send and receive data associated with the user's 101 account to and from the account management system 130 when appropriate. For example, the application 118 may communicate user 101 interactions with the application 118 via the user interface 119 to the account management system 130.

In an example embodiment, the user interface 119 may be a touch screen, a voice-based interface or any other interface that allows the user 101 to provide input and receive output from an application or module on the user computing device 110. In an example embodiment, the user interface 119 enables the user 101 to interact with the application 118 or a web browser 112 application associated with the account management system 130.

An example merchant system 120 comprises a server 121, a website 123, and a data storage unit 125.

In an example embodiment, the server 121 provides the content accessible by the user 101 through the web browser 112 and/or application 118 resident on the user computing device 110, including but not limited to html documents, images, style sheets, and scripts. In an example embodiment, the server 121 supports the merchant system website 123.

In an example embodiment, the website 123 is a means by which the user 101 purchases a product from the merchant system 120. In an example embodiment, the user computing device 110 web browser 112 is redirected by the account management system 130 to the merchant system website 123 to purchase a product that a user 101 request via a voice purchase command. In an example embodiment, the website 123 receives user 101 payment information from the user computing device 110 or from the account management system 130. In example embodiment, the website 123 processes a payment transaction using the user's 101 payment account information. For example, the website 123 may communicate with an issuer system or financial institution system associated with a user 101 payment account to process the payment transaction. In an example embodiment, the website 123 may transmit a receipt to the user computing device 110 in response to successfully processing a payment transaction.

In an example embodiment, the data storage unit 125 comprises a local or remote data storage structure accessible to the merchant system 120 suitable for storing information. In an example embodiment, the data storage unit 125 stores encrypted information, such as HTML5 local storage.

An example account management system 130 comprises a server 131, a website 133, a data storage unit 135, a context determination module 137, and an offer module 139.

In an example embodiment, the server 131 provides the content accessible by the user 101 through the web browser 112 and/or application 118 resident on the user computing device 110, including but not limited to html documents, images, style sheets, and scripts. In an example embodiment, the server 131 supports the account management system website 133.

In an example embodiment, the website 133 is a means by which the user 101 establishes an account with the account management system 130. In an example embodiment, the user 101 interacts with the account managed by the account management system 130 via the website 133. In an example embodiment, the user 101 accesses the website 133 via the web browser 112. In another example embodiment, the user 101 accesses the website 133 via the application 118 resident on the user computing device 110.

In an example embodiment, the data storage unit 135 comprises a local or remote data storage structure accessible to the account management system 130 suitable for storing information. In an example embodiment, the data storage unit 135 stores encrypted information, such as HTML5 local storage. In an example embodiment, the data storage unit 135 stores information associated with a user's 101 account. In an example embodiment, the data storage unit 135 may store a media database comprising annotated video files, audio files, websites, and/or other media. In this example embodiment, each file is annotated with product names describing products featured in the respective media. For example, an annotated video file in the database comprises annotations describing products displayed during certain time intervals of the corresponding video.

In an example embodiment, the context determination module 137 determines a purchase command context for a received voice purchase command. In an example embodiment, the context determination module 137 receives a voice purchase command. In an example embodiment, the context determination module 137 receives one or more of internal data, external data, and/or user 101 from the user computing device 110. Example internal data comprises a description of any websites, videos, audio, applications, or other matter operating on the user computing device 110 displayed to the user 101 on the user interface 119 of the user computing device 110. Example external data comprises a live video or audio data feed recorded by the user computing device 110 and location data logged by the user computing device 110 describing a location of the user computing device 110. In an example embodiment, the context determination module 137 determines a purchase command context internal to the user computing device 110. For example, the context determination module 137, based on the internal data, identifies a video, audio file, website, image, or other applicable media that was executing on the user computing device 110 at the time the user submitted the voice purchase command. In this example embodiment, the context determination module 137 accesses the media database and finds an annotated media file corresponding to the media file that was executing on the user computing device 110 at the time the voice purchase command was submitted. In this example embodiment, the context determination module 137 identifies a purchase command context from the annotated media file. In another example embodiment, the context determination determines a purchase command context external to the user computing device 110. For example, the context determination module 137, based on the external data, identifies an output of an electronic device 140 which the user 101 was watching or listening at the time the user 101 submitted the voice purchase command as the purchase command context. In another example, the context determination module 137, based on the external data, identifies a live demonstration of a product at a merchant location 120 located at or within a certain distance to the user's 101 location as the purchase command context. In an example embodiment, the context determination module 137 determines a product that the user 101 desires to purchase based on the determined purchase command context.

In an example embodiment, the offer module 139 identifies a merchant system 120 offering the user's 101 desired product for sale. In an example embodiment, the offer module 138 identifies a merchant system 120 website 123 that directs the user computing device 110 to a virtual shopping cart of the merchant system 120 comprising the user 101 desired product. In an example embodiment, the offer module 138 provides a link for the merchant system 120 website 123 for purchasing the desired product to the user computing device 110.

In an example embodiment, the electronic device 140 comprises a television, radio, personal computer, tablet device, mobile device, or other electronic device 140 other than and external to the user computing device 110. In an example embodiment, the electronic device 140 outputs a purchase command context in which a user 101 submits a voice purchase command to the user computing device 110. For example, the user 101 is watching an advertisement on the electronic device 140 and submits a voice purchase command to the user computing device 110 to purchase the product displayed on the electronic device 140.

It will be appreciated that the network connections shown are example and other means of establishing a communications link between the computers and devices can be used. Moreover, those having ordinary skill in the art having the benefit of the present disclosure will appreciate that the user computing device 110, the merchant system 120, the account management system 130, and the electronic device 140 illustrated in FIG. 1 can have any of several other suitable computer system configurations. For example, a user computing device 110 embodied as a mobile phone or handheld computer may or may not include all the components described above.

Figure 9:
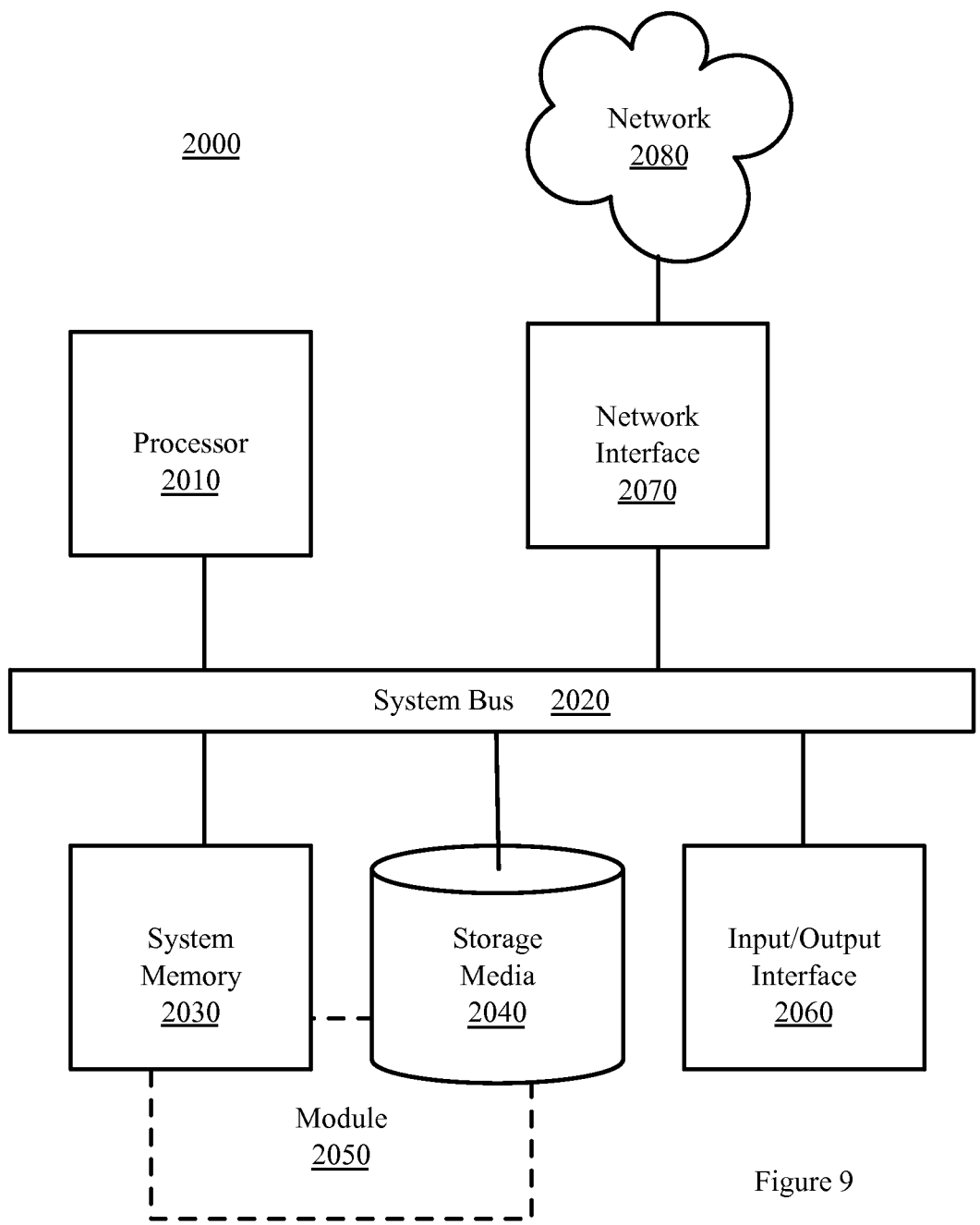
FIG. 9 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 9. Furthermore, any modules associated with any of these computing machines, such as modules described herein or any other modules (scripts, web content, software, firmware, or hardware) associated with the technology presented herein may by any of the modules discussed in more detail with respect to FIG. 9. The computing machines discussed herein may communicate with one another as well as other computer machines or communication systems over one or more networks, such as network 150. The network 150 may include any type of data or communications network, including any of the network technology discussed with respect to FIG. 9.

Example Processes

The example methods illustrated in FIGS. 2-8 are described hereinafter with respect to the components of the example operating environment 100. The example methods of FIGS. 2-8 may also be performed with other systems and in other environments.

Figure 2:
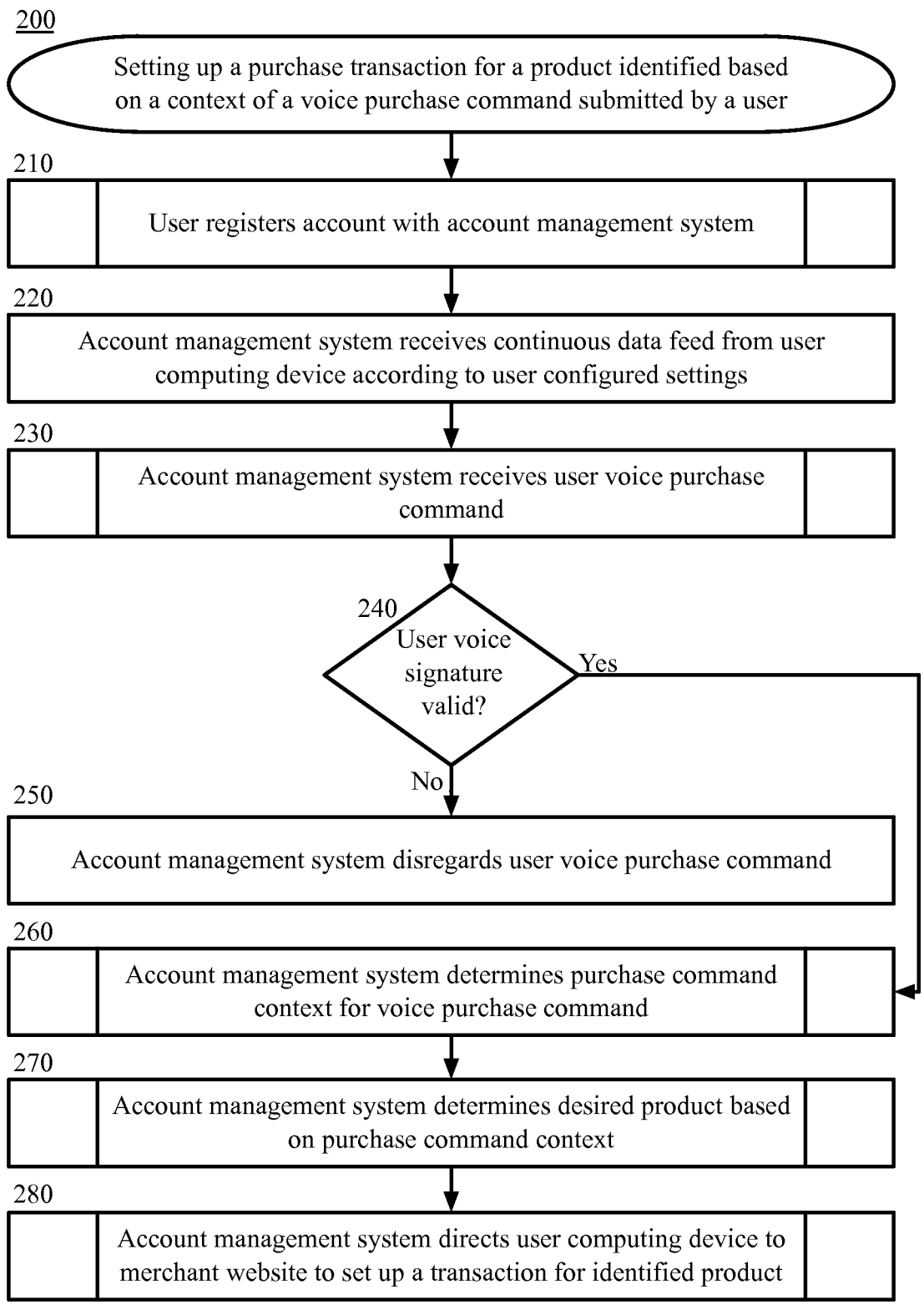
FIG. 2 is a block flow diagram depicting a method for setting up a purchase transaction for a product identified based on a context of a voice purchase command submitted by a user, in accordance with certain example embodiments.

FIG. 2 is a block diagram depicting a method 200 for setting up a purchase transaction for a product identified based on a context of a voice purchase command submitted by a user 101, in accordance with certain example embodiments. The method 200 is described with reference to the components illustrated in FIG. 1.

In block 210, a user 101 registers an account with an account management system 130.

Figure 3:
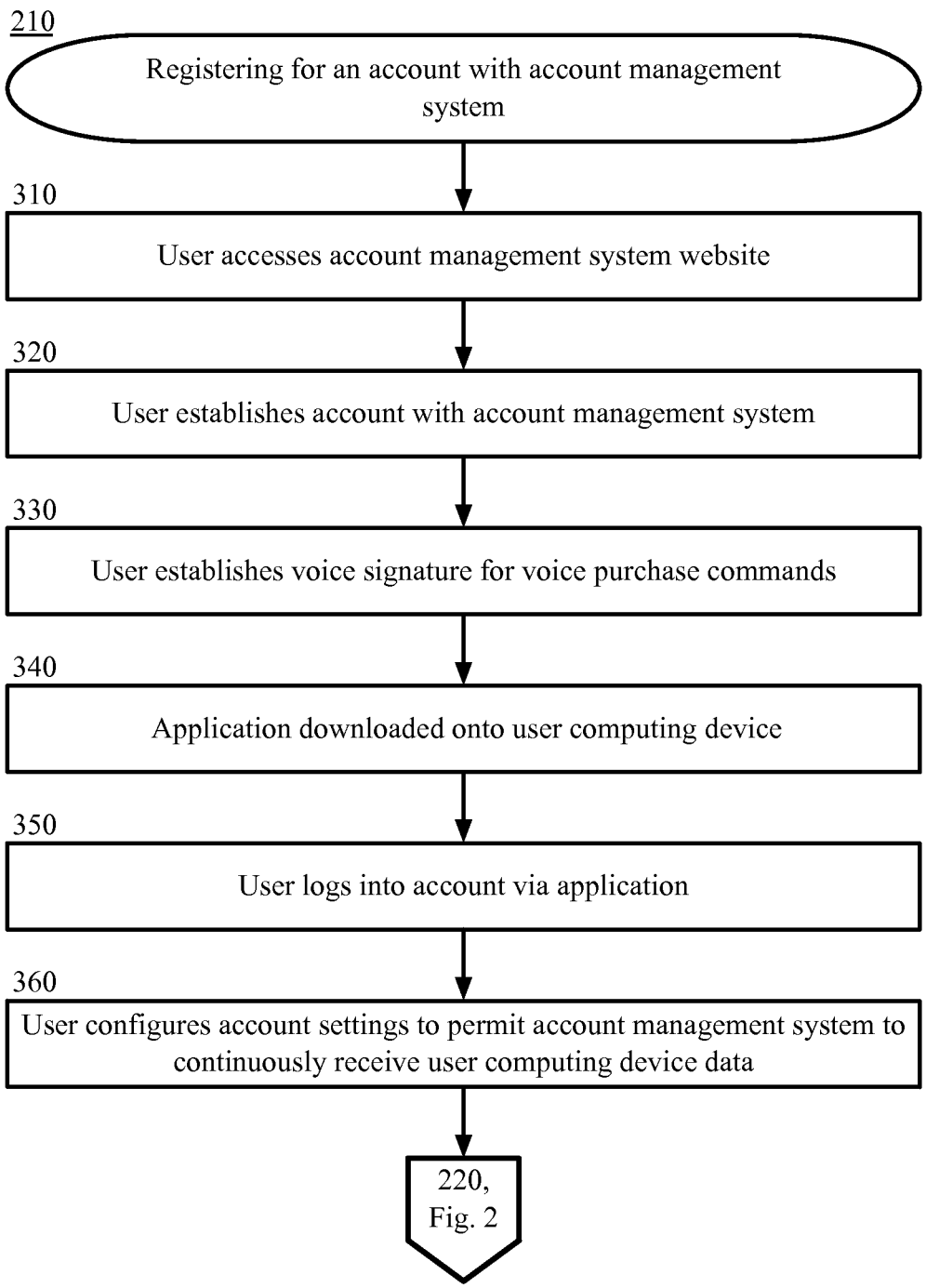
FIG. 3 is a block flow diagram depicting a method for registering for an account with an account management system, in accordance with certain example embodiments.

FIG. 3 is a block diagram depicting a method 210 for registering an account with an account management system 130, in accordance with certain example embodiments. The method 210 is described with reference to the components illustrated in FIG. 1.

In block 310, the user 101 accesses an account management system website 133. In an example embodiment, the user 101 accesses the account management system website 133 via the web browser 112 of the user computing device 110. For example, the user 101 enters the website 133 address in the address bar of the web browser 112 to access the website 133. In another example embodiment, the user 101 accesses the account management system website 133 using an application resident on the user computing device 110. For example, the user 101 selects an application on the user computing device 110 that connects the user 101 to the account management system website 133.

In block 320, the user 101 establishes an account with the account management system 130. In an example embodiment, the user account comprises a digital wallet account, an email account, a file storage and sharing account, or other account managed by the account management system 130. In an example embodiment, the user 101 registers a username and a password associated with the account to use to sign in to the user 101 account. In an example embodiment, the user 101 may register a username and a password that is used for multiple user 101 accounts associated with the account management system 130. In an example embodiment, the user 101 establishes a digital wallet account with the account management system 130. In this example embodiment, the user 101 enters payment account information corresponding to one or more payment accounts of the user 101. For example, the user 101 may enter payment account information corresponding to one or more credit accounts, bank accounts, or merchant system 120 credit accounts. In an example embodiment, the user 101 selects an option on the user 101 account to enable the account management system 130 to respond to voice command purchase requests. For example, the user 101 selects an option on the user 101 account that reads, "enable voice-based purchasing."

In block 330, the user 101 establishes a voice signature for voice purchase requests. In an example embodiment, a voice signature comprises characteristics of a user's 101 voice that are unique from characteristics of voices of other users 101. For example, a voice signature may comprise one or more voice biometrics of the user's 101 voice. In an example embodiment, to establish a voice signature for voice purchase requests, the user 101 transmits one or more voice recordings of the user's 101 voice to the account management system 130 via the user computing device 110. For example, the account management system 130, via the user computing device 110, may request that the user 101 to submit a recording of his or her voice as the user 101 is reading a requested passage of text to establish a voice signature of the user's 101 voice. In this example, the account management system 130 instructs the user computing device 110 to record, the user 101 reads the requested passage, and the user computing device submits the voice recording to the account management system 130 via the network 150.

In certain example embodiments, the voice signature may also comprise a password or passphrase for use in voice purchase commands. For example, the user 101 may configure account settings to only permit the account management system 130 to execute a voice purchase command if the user 101 speaks a certain combination of words. For example, the user 101 configures the voice signature such that the account management system 130 only regards voice purchase commands ending in "for me." In this example, the account management system 130 executes a voice purchase command comprising "Buy this for me!" but disregards a voice purchase command comprising, "Buy this!"

In block 340, an application 118 is downloaded onto the user computing device 110. In another example embodiment, the user 101 may download various applications associated with the user account from the account management system 130 in addition to the application 118. For example, the user 101 downloads one or more of an email application, a mapping application, a social network application, or a search application associated with the account management system 130. In this example, the user 101 may maintain a universal username and/or password to access all the applications associated with the account management system 130. In another example embodiment, the application 118 is downloaded onto the user computing device 110 before the user 101 establishes the user 101 account with the account management system 130. In certain example embodiments, the user 101 does not download the application 118 onto the user computing device 110. For example, the user 101 may access the account using a web browser 112 application associated with the account management system 130 or may access the account directly on the account management system website 133 using the web browser 112. In an example embodiment, the application 118 communicates with the account management system 130 over the network 150. In this example, the application 118 communicates with the account management system 130, which administers the user 101 account.

In block 350, the user 101 logs into the account via the application 118. For example, the user 101 selects the application 118 on the user computing device 110, enters a user name and/or password via the user interface 119, and selects an option on the application 118 reading "log in to my account." In an example embodiment, the application 118 communicates with the account management system 130 when the user 101 is logged in to the application 118. In an example embodiment, the account management system 130 is unable to process voice purchase commands when the user 101 is not logged into his account via the application 118 and/or a web browser 112 application operating on the user computing device 110 and communicating with the account management system 130.

In block 360, the user 101 configures account settings to permit the account management system 130 to continuously receive user computing device 110 data. In an example embodiment, the user 101 accesses account settings via the application 118. In an example, the user's 101 account comprises information notifying the user 101 that the account management system 130 is only able to process voice purchase command when the user 101 permits the user computing device 110 to transmit data to the account management system 130. In an example embodiment, the application 118 displays an option for the user 101 to permit the user computing device 110 to transmit data the account management system 130 continuously, periodically, or in response to receiving a voice purchase command from the user 101.

In this example embodiment, the user 101 selects the option to permit the user computing device 110 to transmit data to the account management system 130 by actuating one or more objects of the user interface 119 of the user computing device. In an example embodiment, the application 118 communicates the user's 101 configuration of the user's 101 account settings to the account management system 130 via the network 150. In an example embodiment, if the user 101 selects the option to allow the user computing device 110 to transmit data to the account management system 130, the user computing device 110 continuously or periodically transmits data to the account management system 130 while the user 101 is logged into the application 118. In this example embodiment, if the user 101 signs out of the application 118, then the user computing device 110 ceases to transmit data to the account management system 130 until the user 101 signs back into the application 118.

In an example embodiment, data transmitted by the user computing device 110 to the account management system 130 comprises internal data describing an internal operating state of the user computing device 110. For example, the user computing device 110 may transmit internal data describing what is currently being displayed to the user 101, for example, if the user 101 is watching a particular video or listening to a particular song on the user computing device 110. In another example, the user computing device 110 transmits internal data comprising the internet address of a website that the user 101 is currently viewing. In another example embodiment, data transmitted by the user computing device 110 to the account management system 130 comprises external data describing an external environment of the user computing device 110. For example, the user computing device 110 may transmit external data comprising a live audio or video feed recorded by the user computing device 110 to the account management system 130.

In an example embodiment, the user computing device 110 transmits internal data and/or external data to the account management system 130 continuously or periodically. For example, the user computing device 110 continuously or periodically transmits external data comprising a live video or audio data feed recorded by the user computing device 110. In another example, the user computing device 110 continuously or periodically transmits internal data comprising a description of any websites, videos, audio, applications, or other matter operating on the user computing device 110 that is currently being displayed to the user 101 on the user interface 119 of the user computing device 110. In another example embodiment, the user computing device 110 transmits internal and/or external data to the account management system 130 after the user 101 submits a voice purchase command. In this example embodiment, the user computing device 110 continuously and/or periodically logs internal and/or external data and stores the data in a data storage unit 115 of the user computing device 110 to retrieve and transmit to the account management system 130 when appropriate. In another example embodiment, the user computing device 110 logs internal and/or external data in response to receiving a voice purchase command from a user. In this example embodiment, the user computing device 110 logs internal and/or external data for a certain period of time after receiving the voice purchase command and then transmits the logged data to the account management system 130. In certain example embodiments, the user computing device 110 may only transmit the data to the account management system while the user 101 is logged in to the application 118 and if the user 101 account settings are configured by the user 101 to allow the user computing device 110 to transmit such data.

From block 360, the method 210 proceeds to block 220 of FIG. 2.

Returning to FIG. 2, in block 220, the account management system 130 receives a continuous data feed from the user computing device 110 according to user 101 configured settings.

In block 230, the account management system 130 receives a user 101 voice purchase command.

In an example embodiment, the user 101 desires to purchase a product in a purchase command context internal to the user computing device 110. In this example embodiment, the user 101 becomes aware of through interaction with the user computing device 110. In this example embodiment, the user 101 may be watching a video, listening to audio, looking at a website, or interacting with some other applicable program, module, application, or file that is executing on the user computing device 110. In this example embodiment, the user 101 becomes aware of a product that the user 101 desires to purchase via the user's 101 interaction with the user computing device 110. For example, the user 101 is watching a video executing on the user computing device 110 comprising a review of a product. In this example, at some point during the video the product is displayed in the video, the user 101 notices the product, desires to purchase the product, and submits a voice purchase command. For example, upon seeing the product displayed on the video executing on the user computing device 110, the user 101 shouts a voice purchase command comprising "I want to buy that!" In this example embodiment, the user computing device 110 records the user 101 voice purchase command.

In another example embodiment, the user 101 desires to purchase a product in a purchase command context external to the user computing device 110. In this example embodiment, the user 101 desires to purchase a product that the user 101 becomes aware of through interaction with an electronic device 140 external to the user computing device 110. In this example embodiment, the user 101 may be watching a video, or interacting with some other applicable program, module, application, or file that is executing on the electronic device 140 in proximity to the user computing device 110. In this example embodiment, the user 101 is logged into the application 118 and the user computing device 110 is able to record an output of the electronic device 140 as the user is interacting with the electronic device 140. For example, the electronic device 140 is a television and the user computing device 110 records an audio output of the television as the user 101 is watching the television. In this example embodiment, the user 101 becomes aware of a product that the user 101 desires to purchase via the user's 101 interaction with the electronic device 140. For example, the user 101 is watching a video executing on the electronic device 140 comprising an advertisement of a product. In this example, at some point during the video the product is displayed in the video, the user 101 notices the product, desires to purchase the product, and submits a voice purchase command. For example, upon seeing the product displayed on the video executing on the electronic device 140, the user 101 shouts a voice purchase command comprising "I want to buy that!" In this example embodiment, the user computing device 110 records the user 101 voice purchase command.

Figure 4:
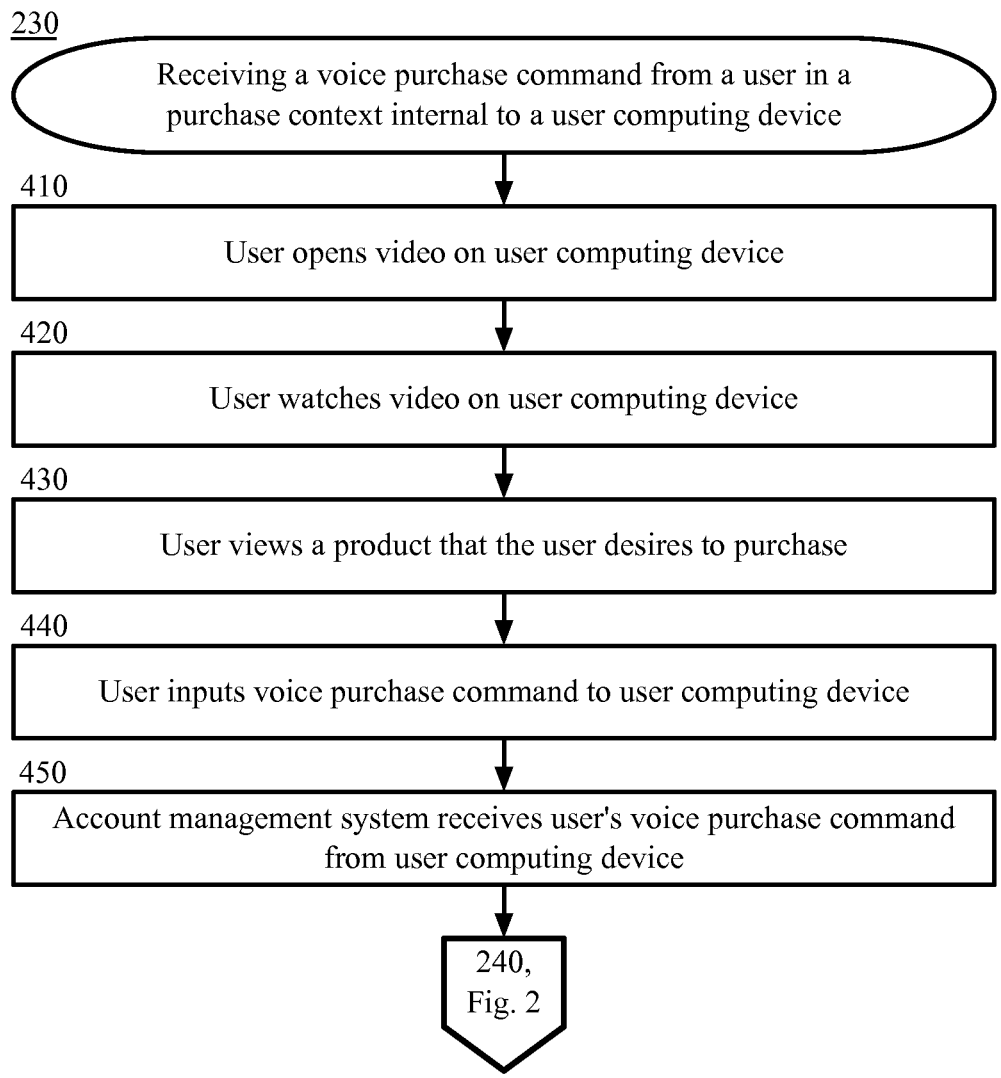
FIG. 4 is a block flow diagram depicting a method for receiving a voice purchase command from a user in a purchase command context internal to a user computing device, in accordance with certain example embodiments.

FIG. 4 is a block diagram depicting a method 230 for receiving a voice purchase command from a user in a purchase command context internal to a user computing device 110, in accordance with certain example embodiments. The method 230 is described with reference to the components illustrated in FIG. 1.

In block 410, the user 101 opens a video on the user computing device 110. In an example embodiment, the user 101 actuates one or more objects on the user interface 119 of the user computing device 110 to open a video. In an example embodiment, the user 101 accesses the video via a web browser 112 over the network 150 or via an application resident on the user computing device 110. In another example embodiment, the user 101 opens an audio file, accesses a website, opens an application, or otherwise interacts with the user computing device 110.

In block 420, the user 101 watches the video on the user computing device 110. In another example embodiment, the user 101 listens to a song or an audio file executing on the user computing device 110. In another example embodiment, the user 101 reads text or looks at images displayed on the user computing device 110.

In block 430, the user 101 views a product that the user 101 desires to purchase. For example, the user views the product displayed in the video. For example, the user 101 views a video advertisement for a pizza offered by a delivery service playing on the user computing device 110 and desires to purchase the advertised pizza. In another example embodiment, the user 101 views a product that the user 101 desires to purchase on a web site displayed in the web browser 112. In another example embodiment, the user 101 listens to the name of a product or to a description of a product on an audio file executing on the user computing device 110.

In block 440, the user 101 inputs a voice purchase command to the user computing device 110. For example, the user 101 says "buy it!" and the user computing device records the user's 101 command. In an example embodiment, when the user computing device 110 receives the voice purchase command input by the user 101, the user computing device 110 logs a time stamp to associate with the voice purchase command. For example, the user computing device 110 records a month, day, year, hour, minute, second, time zone, and/or any other applicable measures of time to record the time at which the user computing device 110 receives the voice purchase command. For example, the user computing device 110 receives a user 101 voice purchase command, logs a timestamp comprising "Feb. 10, 2015-13:25 EST," and associates the time stamp with the voice purchase command. In an example embodiment, the user computing device 110 stores the voice purchase command. In another example embodiment, the user computing device 110 does not store the voice purchase command and immediately transmits the voice purchase command to the account management system 130 along with the logged timestamp. In an example embodiment, the user computing device 110 transmits the user 101 voice purchase command to the account management system 130. In an example embodiment, the user computing device 110 transmits the logged timestamp along with the user 101 voice purchase command.

In block 450, the account management system 130 receives the user's 101 voice purchase command from the user computing device 110. In an example embodiment, the account management system 130 also receives a timestamp generated by the user computing device 110 at the time that the user computing device 110 received the user 101 voice purchase command.

In certain example embodiments, as previously discussed, the user computing device 110 transmits internal data and/or external data to the account management system 130 continuously or periodically. In an example, the user computing device 110 continuously or periodically transmits external data comprising a live video or audio data feed recorded by the user computing device 110. In another example, the user computing device 110 continuously or periodically transmits internal data comprising a description of any websites, videos, audio, applications, or other matter operating on the user computing device 110 that is currently being displayed to the user 101 on the user interface 119 of the user computing device 110.

In certain other example embodiments, the user computing device 110 transmits internal and/or external data to the account management system 130 after the user 101 submits a voice purchase command. In an example embodiment, the user computing device 110 transmits to the account management system 130 internal and/or external data logged over a time period of a certain length before the time at which the voice purchase command was received by the user computing device 110. In this example embodiment, the user computing device 110 continuously and/or periodically logs internal and/or external data and stores the data in a data storage unit 115 of the user computing device 110 to retrieve and transmit to the account management system 130 at the appropriate time. In certain example embodiments, the user computing device 110 may only transmit the data to the account management system while the user 101 is logged in to the application 118 and if the user 101 account settings are configured by the user 101 to allow the user computing device 110 to transmit such data.

From block 450, the method 230 proceeds to block 240 in FIG. 2.

In certain example embodiments, instead of receiving a voice purchase command from a user in a purchase command context internal to a user computing device 110, the user computing device 110 receives a voice purchase command from a user in a purchase command context external to a user computing device 110.

Figure 5:
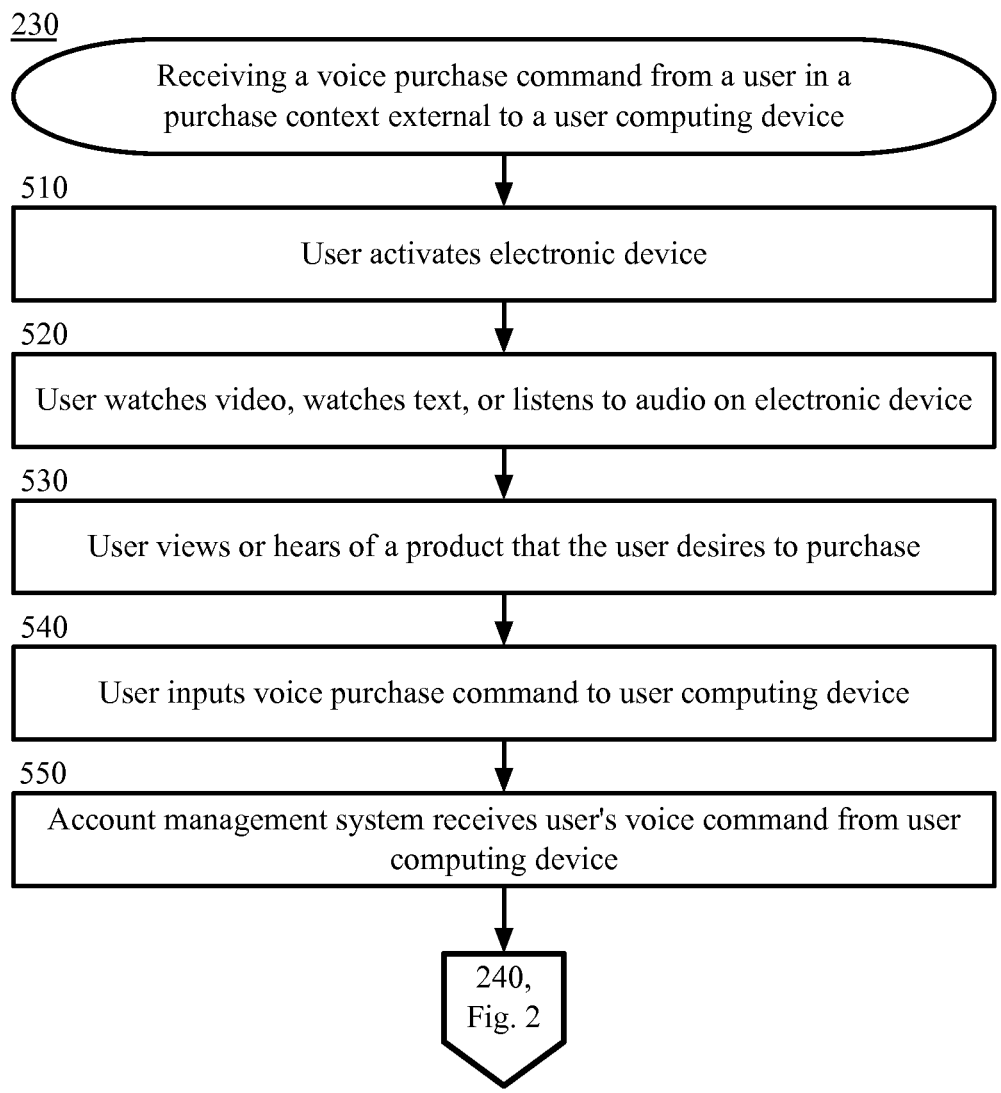
FIG. 5 is a block flow diagram depicting a method for receiving a voice purchase command from a user in a purchase command context external to a user computing device, in accordance with certain example embodiments.

FIG. 5 is a block diagram depicting a method 230 for receiving a voice purchase command from a user in a purchase command context external to a user computing device, in accordance with certain example embodiments. The method 230 is described with reference to the components illustrated in FIG. 1.

In block 510, the user 101 activates an electronic device 140. For example, the user 101 activates a television or a radio device. In an example embodiment, the electronic device 140 is in physical proximity to the user computing device 110 to enable the user computing device 110 to receive or record an output of the electronic device 140. For example, the user computing device 110 is able to record or receive a sound output of a television, personal computer, tablet, radio, or other electronic device 140 that generates at least an audio output via a sound recording capability of the user computing device 110. In another example, the user computing device 110 is able to record a video output of a television via a video recording capability of the user computing device 110.

In block 520, the user 101 watches video, watches text, or listens to audio on the electronic device 140. In an example embodiment, while the video is interacting with the electronic device 140, the user computing device 110 records or receives the output of the electronic device 140

In block 530, the user views or hears of a product that the user 101 desires to purchase. For example, the user views the product displayed in the video. For example, the user 101 views a video advertisement for a pizza offered by a delivery service playing on the electronic device 140 and desires to purchase the advertised pizza. In another example, the user 101 listens to the name of a product or to a description of a product on a radio program executing on a radio electronic device 140 and desires to purchase the product.

In block 540, the user 101 inputs a voice purchase command to the user computing device 110. For example, the user 101 says "buy that!" and the user computing device records the user's 101 command. In an example embodiment, when the user computing device 110 receives the voice purchase command input by the user 101, the user computing device 110 logs a time stamp to associate with the voice purchase command. For example, the user computing device 110 records a month, day, year, hour, minute, second, time zone, and/or any other applicable measures of time to record the time at which the user computing device 110 receives the voice purchase command. For example, the user computing device 110 receives a user 101 voice purchase command, logs a timestamp comprising "Feb. 10, 2015-13:25 EST," and associates the time stamp with the voice purchase command. In an example embodiment, the user computing device 110 stores the voice purchase command. In another example embodiment, the user computing device 110 does not store the voice purchase command and immediately transmits the voice purchase command to the account management system 130 along with the logged timestamp. In an example embodiment, the user computing device 110 transmits the user 101 voice purchase command to the account management system 130. In an example embodiment, the user computing device 110 transmits the logged timestamp along with the user 101 voice purchase command. In certain example embodiments, the user computing device 110 does not continuously log external and/or internal data and, in response to receiving the user 101 voice purchase command, the user computing device 110 logs external and/or internal data for a certain period of time and then transmits the logged data to the account management system 130 in addition to the logged timestamp and the user 101 voice purchase command.

In block 550, the account management system 130 receives the user's 101 voice purchase command from the user computing device 110. In an example embodiment, the account management system 130 also receives a timestamp generated by the user computing device 110 at the time that the user computing device 110 received the user 101 voice purchase command.

In certain example embodiments, as previously discussed, the user computing device 110 transmits internal data and/or external data to the account management system 130 continuously or periodically. In an example, the user computing device 110 continuously or periodically transmits external data comprising a live video or audio data feed recorded by the user computing device 110. In another example, the user computing device 110 continuously or periodically transmits internal data comprising a description of any websites, videos, audio, applications, or other matter operating on the user computing device 110 that is currently being displayed to the user 101 on the user interface 119 of the user computing device 110.

In certain other example embodiments, as previously discussed, the user computing device 110 transmits internal and/or external data to the account management system 130 after the user 101 submits a voice purchase command. In an example embodiment, the user computing device 110 transmits to the account management system 130 internal and/or external data logged over a time period of a certain length before the time at which the voice purchase command was received by the user computing device 110. In this example embodiment, the user computing device 110 continuously and/or periodically logs internal and/or external data and stores the data in a data storage unit 115 of the user computing device 110 to retrieve and transmit to the account management system 130 at the appropriate time. In certain example embodiments, the user computing device 110 may only transmit the data to the account management system while the user 101 is logged in to the application 118 and if the user 101 account settings are configured by the user 101 to allow the user computing device 110 to transmit such data.

From block 550, the method 230 proceeds to block 240 in FIG. 2.

Returning to FIG. 2, in block 240, the account management system 130 verifies a voice signature of the received voice purchase command. In an example embodiment, the account management system 130 accesses a first saved user 101 voice signature associated with the user's 101 account, determines a second voice signature of the received user 101 voice purchase command, and compares the first saved voice signature against the second voice signature. In this example embodiment, the account management system 130 may determine a similarity between the first voice signature and the second voice signature. For example, the account management system 130 may compare one or more biometric qualities or properties of the first voice signature against the second voice signature to determine a similarity between the voice signatures. In another example, the account management system 130 may retrieve a password or passphrase from the first voice signature. In this example, the account management system 130 determines whether the passphrase or password from the first voice signature is present in the second voice signature.

If the account management system 130 determines that the second voice signature associated with the received voice purchase command is invalid, the method 200 proceeds to block 250. In an example embodiment, the account management system 130 determines that the first voice signature and the second voice signature are not similar at least to a certain threshold value and the account management system 130 determines that the voice signatures do not match and that the second voice signature is invalid. In another example embodiment, the account management system 130 determines that the second voice signature does not comprise a password or passphrase established by the user in the first voice signature and the account management system 130 determines that the voice signatures do not match and that the second voice signature is invalid. For example, the user 101 established, in the first voice signature and/or via one or more configurations of user 101 account settings, that all user 101 voice purchase requests must comprise the phrases "please" at the beginning and "for me" at the end. In this example, the voice command submitted by the user 101 comprises "please purchase this" and does not end in "for me," therefore the account management system 130 determines that the second voice signature does not comprise the required passphrases from the first voice signature.

In block 250, the account management system 130 disregards the user 101 voice purchase command. In another example embodiment, the account management system 130 transmits, via the user computing device 110, a request for the user 101 to provide a password associated with the user 101 account. In this example embodiment, the account management system 130 may lock the user 101 out of the user 101 account as a security measure until the user 101 provides the requested password.

Returning to block 240, if the account management system 130 determines that the voice signature is valid, the method 200 proceeds to block 260. In this example embodiment, the account management system 130 determines that the first voice signature and the second voice signature are similar at least to a certain threshold value and the account management system 130 determines that the voice signatures match and that the second voice signature is valid. In another example embodiment, the account management system 130 determines that the second voice signature comprises a required password or passphrase established by the user in the first voice signature and the account management system 130 determines that the voice signatures match and that the second voice signature is valid. For example, the user 101 established, in the first voice signature and/or via one or more configurations of user 101 account settings, that all user 101 voice purchase requests must comprise the phrases "please" at the beginning and "for me" at the end. In this example, the voice command submitted by the user 101 comprises "please purchase this for me," therefore the account management system 130 determines that the second voice signature comprises the required passphrases from the first voice signature and that the second voice signature is valid.

In block 260, the account management system 130 determines a purchase command context for the voice purchase command.

Figure 6:
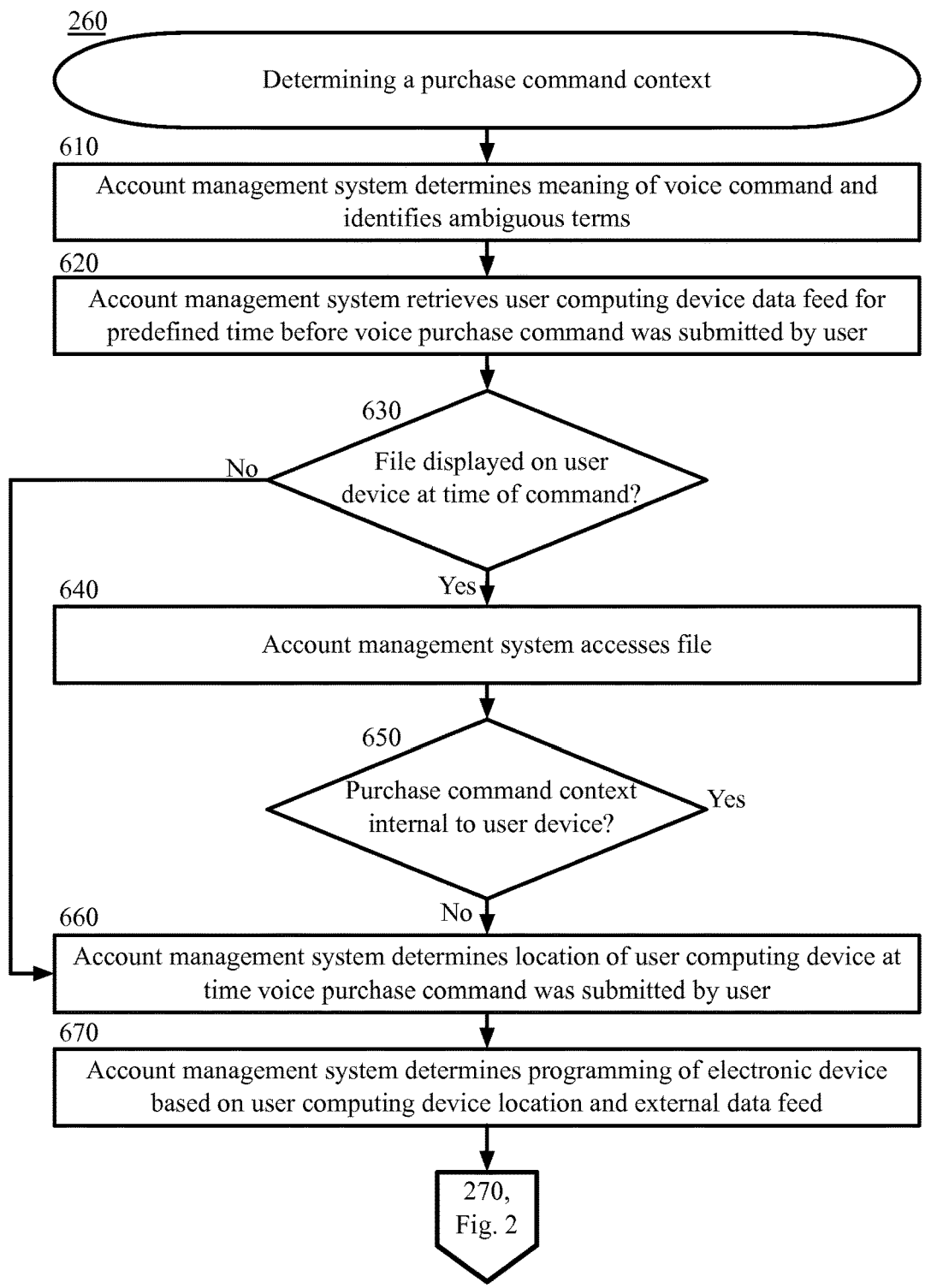
FIG. 6 is a block flow diagram depicting a method for determining a purchase command context, in accordance with certain example embodiments.

FIG. 6 is a block diagram depicting a method 260 for determining a purchase command context and identifying a product associated with a voice purchase command, in accordance with certain example embodiments. The method 260 is described with reference to the components illustrated in FIG. 1.

In block 610, the account management system 130 determines the meaning of the voice purchase command and identifies ambiguous terms. In an example embodiment, the account management system 130 uses one or more rules of grammar and/or a dictionary to determine the meaning of the voice command and identify ambiguous terms. For example, the voice purchase command comprises, "buy it." In this example, the account management system 130 determines that the user 101 desires to execute a voice purchase command based on the verb "buy." In this example, the account management system 130 identifies the ambiguous term "it" in the voice purchase command. In another example, the voice purchase command comprises, "buy this pizza." In this example, the account management system 130 determines that the user 101 desires to execute a voice purchase command to purchase a pizza based on the verb "buy" and the direct object "pizza." In this example, the account management system 130 identifies the ambiguous term "this" in the voice purchase command.

In block 620, the account management system 130 retrieves a user computing device 110 data feed for a predefined time before the time at which the voice purchase command was submitted by the user 101. For example, the data feed comprises internal and/or external data logged by the user computing device 110. For example, the account management system 130, based on a timestamp received from the user computing device 110 identifying the time at which the voice purchase command was received by the user computing device 110, extracts all data received from the user computing device 110 from a predefined time period prior to the time of the timestamp all the way up until the time of the timestamp. In another example embodiment, the account management system 130, based on a timestamp received from the user computing device 110 identifying the time at which the voice purchase command was received by the user computing device 110, extracts data received from the user computing device 110 from the time of the timestamp up to a predefined time period after the time of the timestamp. In yet another example embodiment, the account management system 130 receives, from the user computing device 110 a data feed logged by the user computing device 110 during the predefined time along with the voice purchase command and/or timestamp. For example, the account management system 130 receives a data feed from the user computing device 110 comprising data logged during a predefined time before the voice purchase command and/or the time associated with the timestamp. In another example, when the user 101 submits the voice purchase command to the user computing device 110, the user computing device 110 is not currently logging internal or external data. In this example, the user computing device 110, in response to receiving the user 101 voice purchase command, begins to log internal and/or external data for a certain period of time. In this example, the user computing device 110, after logging the data for the certain period of time, transmits the logged data to the account management system 130 along with the user 101 voice purchase command. In this example, the account management system 130 receives the logged data associated with the certain period of time subsequent to the user computing device 110 receiving the voice purchase command, a timestamp associated with the time at which the user computing device 110 received the voice purchase command, and the user 101 voice purchase command. In yet another example embodiment, in response to receiving the voice purchase command and determining that the voice signature is valid, the account management system 130 transmits to the user computing device 110 a request for a data feed for a predefined time before the time at which the voice purchase command was submitted by the user 101. In this example embodiment, the user computing device 110 receives the request for a data feed and transmits the requested data feed to the user computing device 110. For example, the user computing device 110 retrieves the generated timestamp associated with the voice purchase command and transmits all applicable or relevant data logged, captured, or recorded by the user computing device 110 for a predefined period of time prior to the time specified in the time stamp. In an example embodiment, the data feed transmitted by the user computing device 110 and received by the account management system 130 comprises internal and/or external data. For example, external data may comprise a live video or audio data feed recorded by the user computing device 110. For example, internal data may comprise a description of any websites, videos, audio, applications, or other matter operating on the user computing device 110 displayed to the user 101 on the user interface 119 of the user computing device 110.

In block 630, the account management system 130 determines, based on the user computing device 110 data feed, whether a file was displayed or was playing on the user computing device 110 at the time of the voice purchase command. In an example embodiment, the account management system 130 analyzes received internal data from the user computing device 110 to determine whether a file was displayed or was playing on the user computing device 110 at the time of the voice purchase command. In another example embodiment, the account management system 130 may determine whether a file was displayed or was playing on the user computing device 110 at the time of the voice purchase command or during a predetermined time period before the time of the voice purchase command.

If a file was not being displayed or playing on the user computing device 110 at the time of the voice purchase command, the method 260 proceeds to block 660. For example, if a file was not being displayed or playing on the user computing device 110, the purchase command context of the user's 101 voice purchase command may be a purchase command context that is external to the user computing device 110 and the account management system 130 may determine the purchase command context based on an external environment of the user computing device 110 instead of an internal operating state of the user computing device 110.

In block 660, the account management system 130 determines the location of the user computing device 110 at the time the voice purchase command was submitted by the user 101. In an example embodiment, external data comprises one or more locations of the user computing device 110 logged by the user computing device 110.

Returning to block 630, if a file was being displayed or was playing on the user computing device 110 at the time of the voice purchase command, the method 260 proceeds to block 640. In another example embodiment, if a file was being displayed or was paying on the user computing device 110 at the time of the voice purchase command, or within a predetermined time period prior to the time of the voice purchase command, the method 260 proceeds to block 640. For example, if a file was being displayed or playing on the user computing device 110, the purchase command context of the user's 101 voice purchase command may be a purchase command context that is internal to the user computing device 110 and the account management system 130 may determine the purchase command context based on an internal operating state of the user computing device 110 instead of an external environment of the user computing device 110. In another example, if a file was being displayed or playing on the user computing device 110 two seconds before a voice purchase command was received by the user computing device 110, the purchase command context of the user's 101 voice purchase command may be a purchase command context that is internal to the user computing device 110 and the account management system 130 may determine the purchase command context based on an internal operating state of the user computing device 110 instead of an external environment of the user computing device 110.

In block 640, the account management system 130 accesses the file. In an example embodiment, the account management system 130 comprises a media database comprising annotated video files, audio files, websites, and/or other media. In this example embodiment, each file is annotated with product names describing products featured in the respective media. In an example embodiment, an annotated video file in the database comprises annotations describing products displayed during certain time intervals of the corresponding video. For example, an annotated video file corresponding to a video of five minutes duration might be annotated showing that a brand A window cleaning product is shown between 1 minute and 22 seconds and 1 minute and 55 seconds of the video and a brand B vacuum cleaner is shown between 2 minutes and 3 minutes and 25 seconds of the video. In an example embodiment, the account management system 130 annotates one or more video files, audio files, website files, and/or other media files corresponding to one or more videos, audio clips, websites, and/or other media. For example, the account management system 130 comprises a web crawler that gathers videos, audio, images, and/or website information over the network 140. In this example, the account management system 130 analyzes the content of the media and generates annotated files corresponding to each media that describe the products displayed or broadcasted in a media file and specific timing information for when the products are displayed in the media.

In block 650, the account management system 130 determines whether the purchase command context is an internal function of the user computing device 110 or an external environment to the user computing device 110. For example, an internal purchase command context results when the user 101 intends to purchase a product that was displayed or otherwise an output of the user computing device 110. In this example, the purchase command context is internal because it is explained by an internal operation of the user computing device 110. In another example, an external purchase command context results when the user 101 intends to purchase a product that was displayed or otherwise output on an electronic device 140 external to the user computing device 110 or otherwise displayed or output in an environment external to the user computing device 110.

If the account management system 130 determines that the purchase command context is an internal function of the user computing device 110, the method 260 proceeds to block 680. In an example embodiment, if the file executing on the user computing device 110 was displaying or broadcasting a product to the user 101 at the time the user 101 submitted a voice purchase command, then the account management system 130 determines that the purchase command context is internal to the user computing device.

In block 680, the account management system 130 determines the desired product associated with the voice purchase command based on the purchase command context. For example, the account management system 130 determines the desired product associated with the voice purchase command based on an internal purchase command context. For example, the file executing on the user computing device 110 was displaying or broadcasting a product to the user 101 at the time the user 101 submitted a voice purchase command. In this example, the account management system 130 identifies the file based on internal data received from the user computing device 110. For example, internal data corresponding to a video may comprise a video file identifier or other media file identifier, a total length of the video and the user's current progress in viewing the video. For example, for a five minute video, the user 101 was at three minutes and twenty three seconds through the video when the user 101 submitted the voice purchase command. In an example embodiment, the account management system 130 may extract an annotated media file corresponding to the media file identifier from the account management system's 130 media database. In this example, the account management system 130 may determine what product or products were being displayed or broadcasted to the user 101 via the user computing device 110 at the three minute and twenty three second mark of the user 101 and/or during a predefined period beforehand. In an example embodiment, the account management system 130 determines that the product identified in the media file as being displayed to the user 101 at the time the user 101 voice purchase command was received by the user computing device 110 is the user's 101 desired product in the voice purchase command.

Returning to block 650, if the account management system determines that the purchase command context is an external environment of the user computing device 110, the method 260 proceeds to block 660. In an example embodiment, the voice purchase command does not make sense in light of the file executing on the user computing device 110 at the time of the user 101 submission of the voice purchase command. In this example embodiment, the file may not have been displaying a product at the time of the user 101 submission of the voice purchase command or during a threshold time before the user 101 submitted the voice purchase command. In another example embodiment, a different product than the product specified in the user's 101 voice purchase command was being displayed to the user 101 at the time the voice purchase command was submitted. For example, a pizza offer was being displayed but the voice purchase command comprises "buy that vacuum cleaner please!" In these example embodiments, the account management system 130 determines that there is no purchase command context internal to the user computing device 110, therefore the purchase command context may be external to the user computing device 110. For example, the user 101 submitted the voice purchase command with an intent to purchase a product displayed on an electronic device 140 external to the user computing device 110 instead of a product displayed on the user computing device 110. In another example, the user 101 submitted the voice purchase command with an intent to purchase a product displayed in a live display, such as product shown at a showroom exposition at a merchant system 120 location.

In block 660, the account management system 130 determines the location of the user computing device 110 at the time the voice purchase command was submitted by the user 101. For example, determining the location of the user computing device 110 at the time the voice purchase command was submitted by the user 101 may provide information to aid in identifying an external purchase command context. In an example embodiment, the account management system 130 transmits a request to the user computing device 110 for the location information logged by the user computing device 110 at a time corresponding to the timestamp associated with the time the voice purchase command was received by the user computing device 110. In this example embodiment, the user computing device 110 receives the request for the location information and transmits the location information to the account management system 130. In another example embodiment, the account management system 130 received, from the user computing device 110 along with the voice purchase command and associated timestamp, the location information of the user computing device 110 corresponding to the time the voice purchase command was received. Example location information comprises global positioning system ("GPS") coordinates logged by the user computing device 110, a physical street address, an indication of proximity to a Wi-Fi beacon, network device, or other device along with the hardware identifier corresponding to the device, which the account management system 130 may use to identify an approximate location of the user computing device 110 if the device is known to the account management system 130. In an example embodiment, the user 101 has configured the user's 101 account settings to allow transmission of location information from the user computing device to the account management system 130. In this example embodiment, the user 101 may be required to be signed in to the application 118 resident on the user computing device 110 or be signed in to the user's 101 account via a web browser 112 application to allow the user computing device 110 to transmit user computing device 110 location information.

In block 670, the account management system 130 determines the programming of an electronic device 140 based on the user computing device 110 location and external data feed. In an example embodiment, the account management system 130 first determines that the user 101 was listening to or watching an output of the electronic device 140 at the time of the user 101 submission of the voice purchase command. For example, the user computing device 110 external data feed received by the account management system 130 may comprise an audio feed of the output of a television electronic device 140. In this example, the user computing device 110 may identify the electronic device as a television and may identify a particular television channel based on an output sound frequency or output sound characteristics of the electronic device 140 as found in the audio data feed. Likewise, the account management system 130 may determine that the electronic device 140 is a radio or a personal computing device other than the user computing device 110. In an example embodiment, if the account management system 130 determines a particular television channel or radio station that was outputted by the electronic device 140 at the time of the voice purchase command, the account management system 130 may correlate the user computing device 110 location to a programming schedule received from the television station or radio station to identify exactly which programming the user 101 was watching or listening to at the time the user 101 submitted the voice purchase command.

In another example embodiment, the external purchase command context is not programming displayed by an electronic device 140, but may be a live demonstration of a product at a merchant system 120 location. For example, the account management system 130 receives a schedule of live demonstrations of products associated with a merchant system 120 location from the merchant system 120. In this example, the account management system 120 correlates the location of the user computing device 110 at the time of the voice purchase command to within a threshold distance of the site of a merchant system 120 location within a certain length of time before the user 101 submission of the voice purchase command or at the same time as the user 101 submission of the voice purchase command.

From block 670, the method 260 proceeds to block 270 in FIG. 2.

Returning to FIG. 2, in block 270, the account management system 130 determines the user's 101 desired product based on the purchase command context.

Figure 7:
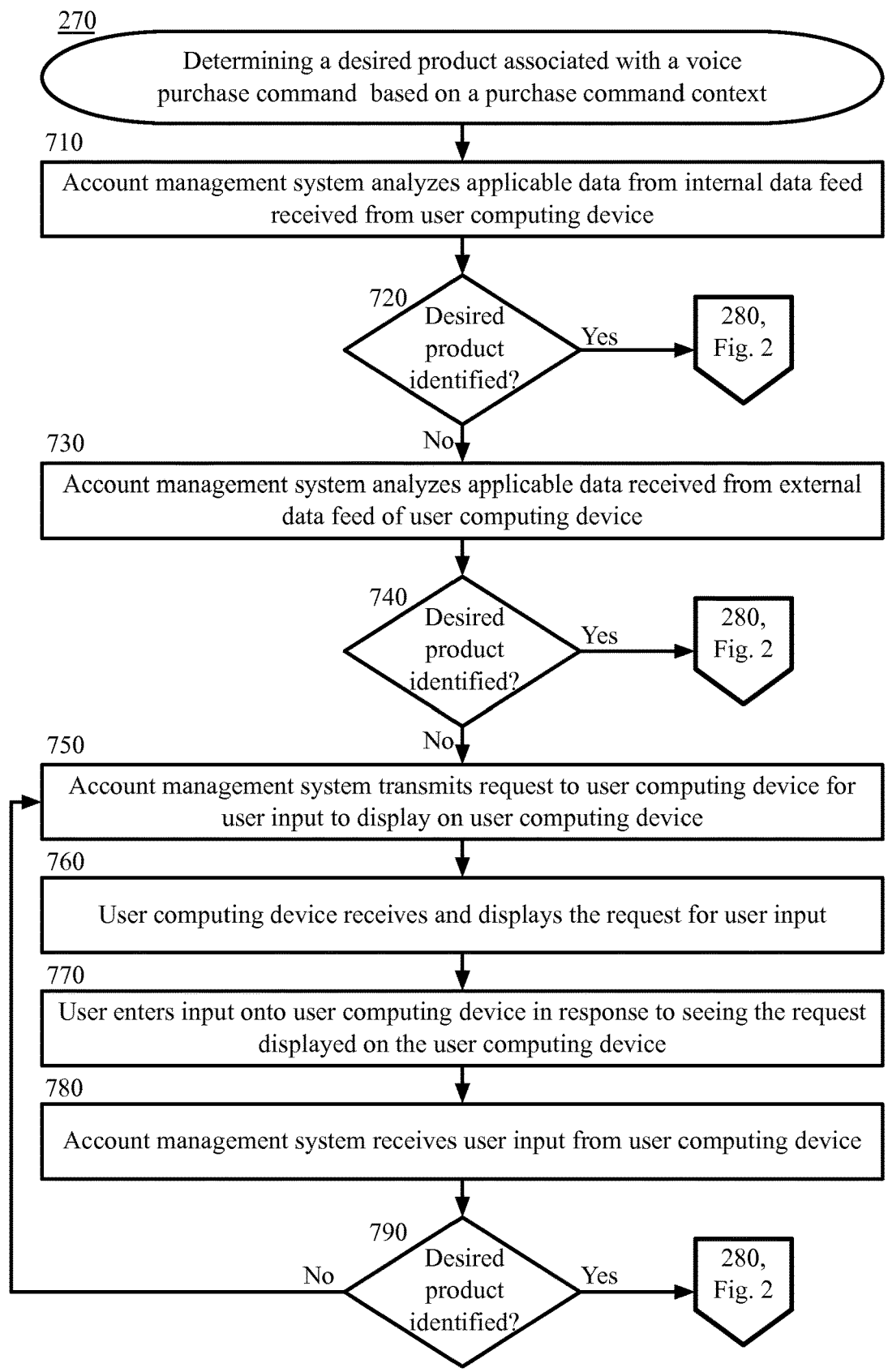
FIG. 7 is a block flow diagram depicting a method for determining a desired product associated with a voice purchase command based on a purchase command context, in accordance with certain example embodiments.

FIG. 7 is a block diagram depicting a method 680 for determining a desired product associated with a voice purchase command based on a purchase command context, in accordance with certain example embodiments. The method 680 is described with reference to the components illustrated in FIG. 1.

In block 710, the account management system 130 analyzes applicable data from an internal data feed received from the user computing device 110. For example internal data transmitted by the user computing device 110 to the account management system 130 describes what is currently being displayed to the user 101 or a history describing was displayed to the user 101 over a certain time period. For example, the user computing device 110 transmits internal data indicating that the user computing device 110 was playing a particular video or a particular song on the user computing device 110 at the time the user 101 submitted the voice purchase command. In another example, the user computing device 110 transmits internal data comprising the internet address of a website that the user 101 is currently viewing or has viewed at a certain time in the past. In an example embodiment, the user computing device 110 continuously logs internal data describing videos, audio, or websites running on or being accessed by the user computing device 110 and transmits the internal data periodically in batches to the account management system 130.

In block 720, the account management system 130 is able or unable to identify a desired product based on the internal data feed received from the user computing device 110.

If the account management system 130 is able to identify a desired product based on the internal data feed received from the user computing device 110, the method 680 proceeds to block 270 in FIG. 2. In an example embodiment, the account management system 130 accesses an annotated media file from the database comprising annotated media files corresponding to the video, audio, or text that the user 101 was watching, listening to, or reading at the time of the user 101 submission of the voice purchase command. In an example embodiment, the account management system 130 may determine, from the annotated media file, what product or products were being displayed or broadcasted to the user 101 via the user computing device 110 at the time of and/or during a predefined period before the user 101 submission of the voice purchase command. In this example embodiment, the account management system 130 determines that the product identified in a media file as being displayed to the user 101 at the time the user 101 voice purchase command is the user's 101 desired product in the voice purchase command.

Returning to FIG. 720, if the account management system 130 is unable to identify a desired product based on the internal data feed received from the user computing device 110, the method 680 proceeds to block 730. For example, the user computing device 110 was not displaying any video, music, images, or websites to the user 101 at the time the user submitted the voice purchase command. In another example, the account management system 130 identifies a desired product based on the internal data feed, but does not have enough information to set up a purchase transaction for the desired product. For example, if the desired product is an item of clothing, the account management system 130 may still need user 101 input comprising a user's 101 clothing size or external data comprising a user 101 location to be able to identify specifically which product the user 101 desires to purchase.

In block 730, the account management system 130 analyzes applicable data received from an external data feed of the user computing device 110. For example, external data comprises an audio feed, a video feed, or other applicable input to the user computing device that describes an environment of the user computing device 110. In an example, the external data feed may be an audio feed, a video feed, or other applicable input recorded by or received by the user computing device 110 that corresponds to an output of an electronic device 140 in the vicinity of the user computing device 110, such as a television, a personal computer, or a radio. In this example, the external data feed may further comprise one or more locations of the user computing device 110 logged by the user computing device 110.

In block 740, the account management system 130 is able or unable to identify a desired product based on the external data feed received from the user computing device 110.

If the account management system 130 is able to identify a desired product based on the external data feed received from the user computing device 110, the method 680 proceeds to block 270 in FIG. 2. In an example embodiment, the account management system 130 accesses an annotated media file from the database comprising annotated media files corresponding to the programming the user 101 was watching on an electronic device 140. In this example embodiment, the account management system 130 may identify a product that was being displayed to the user 101 via the electronic device 140 at the time of the voice purchase command or within a certain length of time before the submission of the voice purchase command. In yet another example embodiment, based on a determination that the user computing device 110 was present at the merchant system 120 location associated with the live display of the product at the time of the submission voice purchase command, the account management system 120 determines that the user 101 intended to purchase the product demonstrated in the live display.

Returning to FIG. 740, if the account management system 130 is unable to identify a desired product based on the external data feed received from the user computing device 110, the method 680 proceeds to block 750. For example, the account management system 130 is unable to identify a product from the electronic device 140 programming being outputted to the user 101 at the time the user 101 submitted the voice purchase command based on the external data feed. In this example, the account management system 130 may determine what electronic device 140 programming was being outputted to the user 101 at certain time intervals before the time the user 101 submitted the voice purchase command based on the external feed. In this example, the user 101 may have watched an advertisement for pizza on the electronic device 140 between 12:05-12:07 p.m. but not issue the voice command "Buy that pizza" until 12:08 p.m., at which time the electronic device 140 was outputting programming other than the pizza advertisement. In this example, the account management system 130 does not determine an external voice command context based on the programming being output by the electronic device at 12:08, but determines that the output between 12:05-12:07 corresponds to the pizza advertisement and determines that the user 101 intended to purchase the pizza displayed in the pizza advertisement. In another example embodiment, the account management system 130 identifies a desired product based on the external data feed, but does not have enough information to set up a purchase transaction for the desired product. For example, if the desired product is an item of clothing, the account management system 130 may still need user 101 input comprising a user's 101 clothing size In another example, if the account management system 130 did not understand the user's 101 voice purchase command, the account management system 130 may request that the user 101 type in or otherwise input a purchase command manually into the user computing device 110.

In block 750, the account management system 130 transmits a request to the user computing device 110 for user 101 input to display on the user computing device 110.

In block 760, the user computing device 110 receives and displays the request for user 101 input. For example, the account management system 130 identified the product the user 101 desires to purchase as being a brand A hat. In this example, the input request displayed on the user computing device 110 may read, "what size brand A hat would you like to purchase?" or "what is your hat size." In an example, the user computing device 110 may display a list of options from which the user 101 may select an option to transmit as input. In another example. In another example, the user computing device 110 may display a request for a text input from the user 101. For example the user computing device 110 may display a request comprising, "please input your hat size." In another example, in which the account management system 130 did not understand the user's 101 voice purchase command, the user computing device 110 may display a request reading, "we're you trying to purchase something? If so, what would you like to purchase?"

In block 770, the user 101 enters input onto the user computing device 110 in response to seeing the request displayed on the user computing device 110. For example, for input regarding a hat the user 101 desires to purchase, the user 101 may select one of multiple user interface 119 objects reading "small," "medium," "large," or "extra large." In another example, the user 101 may input text reading "medium" when asked which hat size the user 101 desires. In another example, the user 101 may manually enter text comprising a purchase command if the account management system 130 did not understand a previous voice purchase command submitted by the user 101.

In block 780, the account management system 130 receives the user input from the user computing device. For example, the account management system 130 receives an indication of a user 101 selection of an option from a list of input options. In another example, the account management system 130 receives a text input submitted by the user 101.

In block 790, the account management system 130 is able or unable to identify the desired product associated with the voice purchase command based on the user 101 input received from the user computing device 110.

If the account management system 130 is unable to identify the desired product associated with the voice purchase command based on the user 101 input, the method 680 returns to block 750.

In block 750, the account management system 130 transmits a request to the user computing device 110 for user 101 input to display on the user computing device 110. For example, the account management system 130 requests second input from the user 101 via the user computing device 110 and receives second input 101 from the user computing device 110 submitted by the user 101. In this example, the account management system 130 determines the user's 101 desired product based on the second input, any previous user 101 input, internal data received from the user computing device 110, and/or external data received from the user computing device 110. If the account management system 130 is still unable to identify the product the user 101 desires to purchase after receiving the second user 101 input, the account management system 130 may disregard the user's 101 voice purchase command.

Returning to block 790, if the account management system 130 is able to identify the desired product associated with the voice purchase command based on the user 101 input, the method 270 proceeds to block 280 in FIG. 2.

Returning to FIG. 2, in block 280, the account management system 130 directs user computing device to a merchant system website 123 to set up a transaction for identified product.

Figure 8:
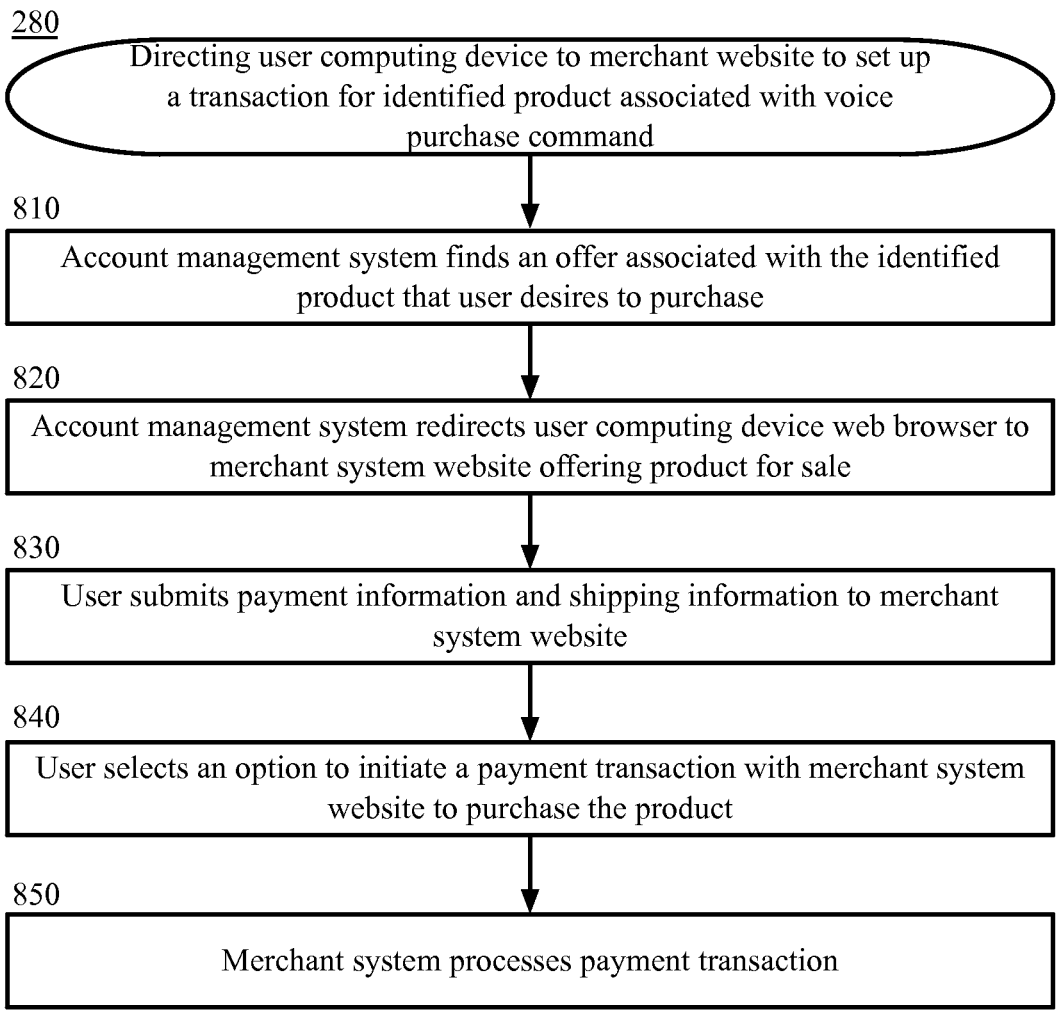
FIG. 8 is a block flow diagram depicting a method for directing a user computing device to a merchant website to set up a transaction for an identified product associated with a voice purchase command, in accordance with certain example embodiments.

FIG. 8 is a block diagram depicting a method 270 for directing a user computing device 110 to a merchant system website 123 to set up a transaction for an identified product associated with a voice purchase command, in accordance with certain example embodiments. The method 270 is described with reference to the components illustrated in FIG. 1.

In block 810, the account management system 130 finds an offer associated with the identified product that the user 101 desires to purchase. In an example embodiment, in addition to identifying a product the user 101 desires to purchase from the internal data feed, external data feed, and/or user 101 input data received from the user computing device 110, the account management system 130 identifies a merchant system 120 that sells the product. For example, the user 101 was watching a video on the user computing device produced by the merchant system 120 and the account management system 130 identifies the merchant based on the received internal user computing device 110 data describing the video. In this example embodiment, the account management system 130 accesses a website 123 of the merchant system 130 to identify an offer associated with the product. In another example embodiment, after identifying the product that the user 101 desires to purchase, the account management system 130 searches for offers from online merchant systems 120 and finds one or more offers offering the product for sale online. In this example embodiment, the account management system 130 selects an offer from the one or more offers and identifies a website 123 corresponding to the merchant system 120 offering the product for sale.

In block 820, the account management system 130 redirects the user computing device web browser 112 to a merchant system website 123 offering the product for sale. In an example embodiment, the website 123 to which the user computing device 110 web browser 112 is redirected displays a virtual shopping cart with an icon representing the user's 101 desired product in the virtual shopping cart.

In block 830, the user 101 submits payment information and shipping information to the merchant system website 123. For example, the user 101 submits payment account information corresponding to a payment accounts of the user 101, for example, a credit account, a bank account, or a merchant system 120 store credit account. In another example embodiment, the user 101 has a digital wallet account with the account management system 130 and the account management system 130 automatically fills in payment information for the user 101 to the website 123 and all the user 101 has to do is to confirm the transaction to initiate the transaction. In another example embodiment, in which the user 101 has a digital wallet account with the account management system 130, a digital wallet application on the user computing device 110 or a digital wallet web browser 112 application may execute on the user computing device 110 requesting the user 101 to select a payment option from multiple payment options for which the user 101 has provided payment account information to the digital wallet account. In this example embodiment, the user 101 selects a payment account option on the appropriate digital wallet application and the account management system 130 fills in the payment information into the virtual shopping cart on the merchant system 120 website. In these example embodiments, the user 101 may also be required to provide a security code, a card verification code, or a password associated with selected or inputted payment account information.

In block 840, the user 101 selects an option to initiate a payment transaction with the merchant system website 123 to purchase the product. For example, the user 101 activates one or more objects on the user interface 119 directing the merchant website to initiate the payment transaction. For example, the user 101 selects an option on the virtual shopping cart that reads "confirm payment."

In block 850, the merchant system 120 processes the payment transaction. In an example embodiment, the merchant system 120 website 123 receives, from the user computing device 110 via the network 150, an indication of a user 101 selection of an option to confirm the payment transaction after the user 101 reviews the payment information and shipping information. In an example embodiment, the merchant system 120 communicates with an issuer system or financial institution associated with payment information received from the user 101 to process the payment transaction. For example, the user 101 submitted credit card payment information and the merchant system 120 transmits a payment authorization request to the credit card issuer via the credit card acquirer system comprising the payment information, the amount of the transaction, and payment account information associated with an account of the merchant system 120. In this example embodiment, the issuer system approves the payment authorization request, schedules a payment in the transaction amount to an account of the merchant system 120, adds a charge to the user 101 credit card account, and notifies the merchant system 120 that the payment authorization request was approved. In an example embodiment, the merchant system 120 transmits a receipt to the user computing device 110 comprising a summary of the approved transaction and an estimated shipping date.

Other Example Embodiments

FIG. 9 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to identify products based on contexts of voice commands, comprising:
   by an account management computing system:
   receiving, from a computing device, a voice purchase command input detected by a microphone of the computing device at a first time;
   receiving, from the computing device, one or more operating state data describing an internal operating state of the computing device during a first predefined time period prior to the first time, the internal operating state identifying content received from a server different from the account management computing system via a network that is displayed via a display device of the computing device or an internet address of a website accessed by the computing device;
   receiving, from the computing device, one or more input data comprising one or more of a sound input and a video input captured by the computing device at a second time during a second predefined time period that begins prior to the first time, the second time after the first time, the one or more input data different from the content received from the server, and the one or more input data received from a source different from the account management computing system;
   identifying purchase command context data comprising one or more of the operating state data and the one or more input data by comparing the operating state data and the one or more input data to the voice purchase command;
   identifying, based on the purchase command context data, an annotated media file comprising one or more product annotations that identifies one or more products and one or more times at which the one or more products are presented within the annotated media file;
   identifying, from the one or more product annotations, a product corresponding to a particular product annotation based on comparing the one or more product annotations and the purchase command context data; and
   transmitting an offer associated with the identified product to the computing device to display on the computing device.

2. The method of claim 1, further comprising, by the account management computing system:
   in response to receiving the voice purchase command, retrieving a voice signature associated with the computing device; and
   determining that the voice purchase command is valid based on the voice signature, wherein the offer is transmitted to the computing device in response to determining that the voice purchase command is valid.

3. The method of claim 2, wherein the voice signature comprises one or more of a passphrase or physical quality that is unique to a voice.

4. The method of claim 1, wherein the one or more operating state data further comprises display data, the display data comprising one or more of a video, an audio file, a text file, a webpage, or an application displayed on the computing device.

5. The method of claim 1, comprising:
   conducting, via the computing device, a transaction with a merchant computing system to purchase the identified product associated with the transmitted offer.

6. The method of claim 1, further comprising retrieving, by the account management computing system, the one or more stored product annotations from the annotated media file based on the identified purchase command context data.

7. A computer program product to identify products based on contexts of voice commands, comprising:
   a non-transitory computer-readable medium having computer-readable program instructions embodied thereon that when executed by a computer cause the computer to:
   receive, from a computing device, a voice purchase command input detected by a microphone of the computing device at a first time;
   receive, from the computing device, one or more operating state data describing an internal operating state of the computing device during a first predefined time period prior to the first time, the internal operating state identifying content received from a server via a network that is displayed via a display device of the computing device or an internet address of a website accessed by the computing device;
   receive, from the computing device, one or more input data comprising one or more of a sound input and a video input captured by the computing device at a second time during a second predefined time period that begins prior to the first time, the second time after the first time, the one or more input data different from the content received from the server;

identify purchase command context data comprising one or more of the operating state data and the one or more input data by comparing the received operating state data and the one or more input data to the received voice purchase command;

identify, based on the purchase command context data, an annotated media file comprising one or more product annotations that identifies one or more products and one or more times at which the one or more products are presented within the annotated media file;

identify a product for the voice purchase command based on comparing the one or more product annotations to the purchase command context data; and transmit an offer associated with the identified product to the computing device to display on the computing device.

8. The computer program product of claim 7, the non-transitory computer-readable medium further having computer-readable program instructions embodied thereon that when executed by the computer cause the computer to:

receive, from the computing device, the one or more input data comprising one or more of a sound input and a video input captured by the computing device during the second predefined time period prior to the first time, wherein identifying the purchase command context data further comprises comparing the received one or more operating state data and the received one or more input data to the voice purchase command, the purchase command context data further comprising one or more of the input data.

9. The computer program product of claim 7, the non-transitory computer-readable medium further having computer-readable program instructions embodied thereon that when executed by the computer cause the computer to:

retrieve, in response to receiving the voice purchase command, a voice signature associated with the computing device; and determine that the voice purchase command is valid based on the voice signature, wherein the offer is transmitted to the computing device in response to determining that the voice purchase command is valid.

10. The computer program product of claim 9, wherein the voice signature comprises one or more of a passphrase or physical quality unique to a voice.

11. The computer program product of claim 7, comprising:

conducting, via the computing device, a transaction with a merchant computing system to purchase the identified product associated with the transmitted offer.

12. A system to identify products based on contexts of voice commands, comprising:

a storage device; and a processor communicatively coupled to the storage device, wherein the processor executes application code instructions that are stored in the storage device to cause the system to:

receive, from a computing device, a voice purchase command input detected by a microphone of the computing device at a first time;

receive, from the computing device, one or more operating state data that describe an internal operating state of the computing device during a first predefined time period prior to the first time, the internal operating state identifying content received from a server via a network that is displayed via a display device of the computing device or an internet address of a website accessed by the computing device;

receive one or more input data comprising one or more of a sound input and a video input captured by the computing device at a second time during a second predefined time period that begins prior to the first time, the second time after the first time, the one or more input data received from a source different from the server;

identify purchase command context data comprising one or more of the input data and the one or more operating state data by comparing the input data to the voice purchase command;

identify, based on the purchase command context data, an annotated media file comprising one or more product annotations that identifies one or more products and one or more times at which the one or more products are presented within the annotated media file;

identify a product associated with a particular product annotation of the one or more product annotations based on comparing the one or more product annotations and the purchase command context data; and transmit an offer associated with the identified product to the computing device for display on the computing device.

13. The system of claim 12, wherein the processor is further configured to execute computer-readable program instructions stored in the storage medium to cause the system to:

receive, from the computing device, one or more operating state data describing an operating state of the computing device within the second predefined time period prior to the first time, wherein identifying the purchase command context data further comprises comparing the received one or more operating state data and the received one or more input data against the voice purchase command to identify the purchase command context data, the purchase command context data further comprising one or more of the operating state data.

14. The system of claim 13, wherein the one or more operating state data comprises one or more of a video, an audio file, a text file, a webpage, or an application displayed on the computing device.

15. The system of claim 12, wherein the processor is further configured to execute computer-readable program instructions stored in the storage medium to cause the system to:

in response to receiving the voice purchase command, retrieve a voice signature associated with the computing device; and determine that the voice purchase command is valid based on the voice signature, wherein the offer is transmitted to the computing device in response to determining that the voice purchase command is valid.

16. The system of claim 15, wherein the voice signature comprises one or more of a passphrase or physical quality of the voice associated with the computing device.

17. The system of claim 12, comprising:

conducting, via the computing device, a transaction with a merchant computing system to purchase the product associated with the transmitted offer.

* * * * *